United States Patent [19]

Tadokoro et al.

[11] Patent Number: 4,940,500

[45] Date of Patent: Jul. 10, 1990

[54] FILTER MEDIUM FORMING SYSTEM AND PROCESS

[75] Inventors: Shigeo Tadokoro, Kawagoe; Joji Morioka, Saitama; Hideyuki Takahashi, Wako, all of Japan

[73] Assignee: Tsuchiya Mfg. Co., Ltd., Tokyo, Japan

[21] Appl. No.: 236,376

[22] Filed: Aug. 25, 1988

[30] Foreign Application Priority Data

Aug. 31, 1987 [JP] Japan ................................ 62-215227
Aug. 31, 1987 [JP] Japan ................................ 62-215228
May 31, 1988 [JP] Japan ................................ 63-11669

[51] Int. Cl.⁵ .............................................. B31F 1/10
[52] U.S. Cl. ..................................... 156/204; 55/521; 156/227; 156/474; 210/493.2; 210/493.5; 493/415; 493/941
[58] Field of Search ................ 55/521; 156/204, 227, 156/474; 210/493.2, 493.5; 493/415, 941

[56] References Cited

U.S. PATENT DOCUMENTS 4,710,297 12/1987 Suzuki et al. ..................... 210/493.2
4,798,575 1/1989 Siversson ......................... 156/474 X

FOREIGN PATENT DOCUMENTS 206182 12/1986 European Pat. Off. .
57-7806 2/1982 Japan .
867004 5/1961 United Kingdom .
1579231 11/1980 United Kingdom .
WO86/07480 12/1986 World Int. Prop. O. .

Primary Examiner—Robert A. Dawson
Attorney, Agent, or Firm—Foley & Lardner, Schwartz, Jeffery, Schwaab, Mack, Blumenthal & Evans

[57] ABSTRACT

A filter medium forming system for forming a filter medium of the type wherein pleats radially outwardly extends in which sides of the pleats are alternately bonded at the inner and outer peripheral sides to allow fluid to be filtered flows generally along the length of the pleats. The filter medium forming system is comprised of a scoring device for forming linear depressions (score lines) on the opposite side surfaces of an elongate sheet-type filter medium. The scoring device is followed by an adhesive applying device for applying adhesive onto the opposite side surfaces of the filter medium at the edge sections. The adhesive applying device is followed by a pleating device for pleating the filter medium along the linear depressions to form a pleated filter medium having a plurality of pleats each having two sides contiguous through each linear depression. The pleating device is followed by a pressing device for tightly contacting the predetermined sections of the sides of each pleat to bond the predetermined sections with each other with the adhesive. Such a filter medium forming system is suitable for mass production for filter elements while making possible to form the flat filter medium into a predetermined pleated shape at high speed and with high accuracy.

30 Claims, 26 Drawing Sheets

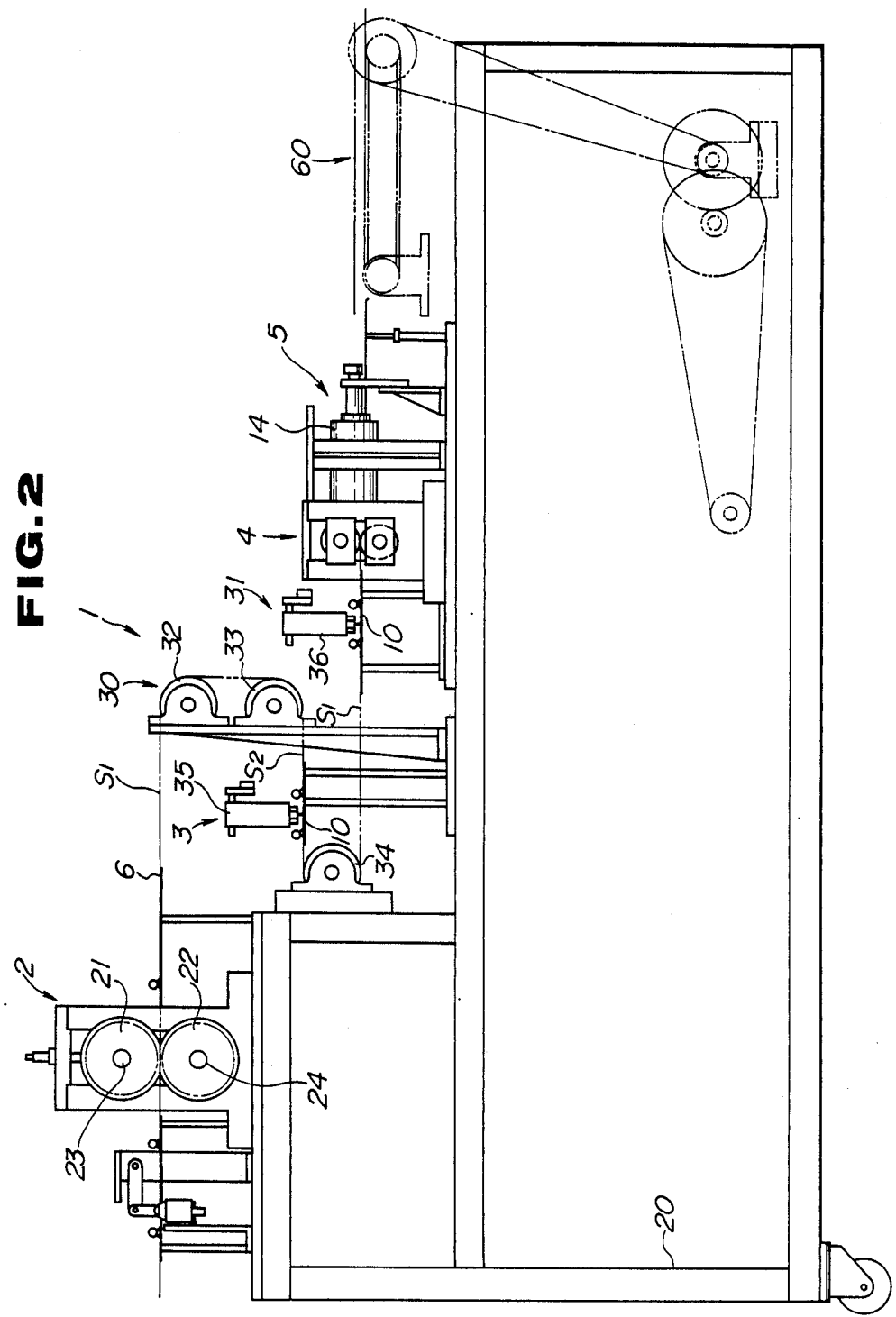

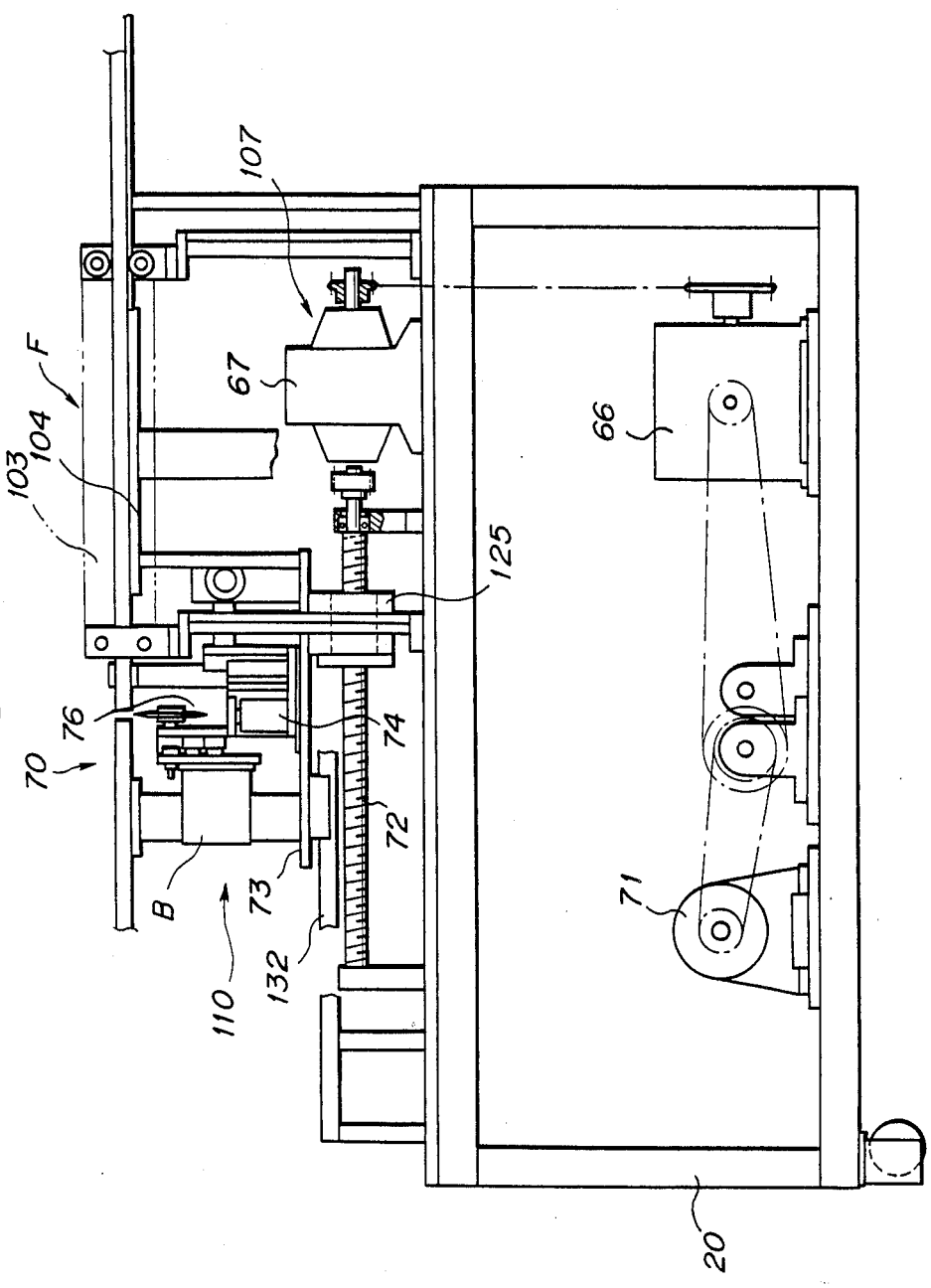

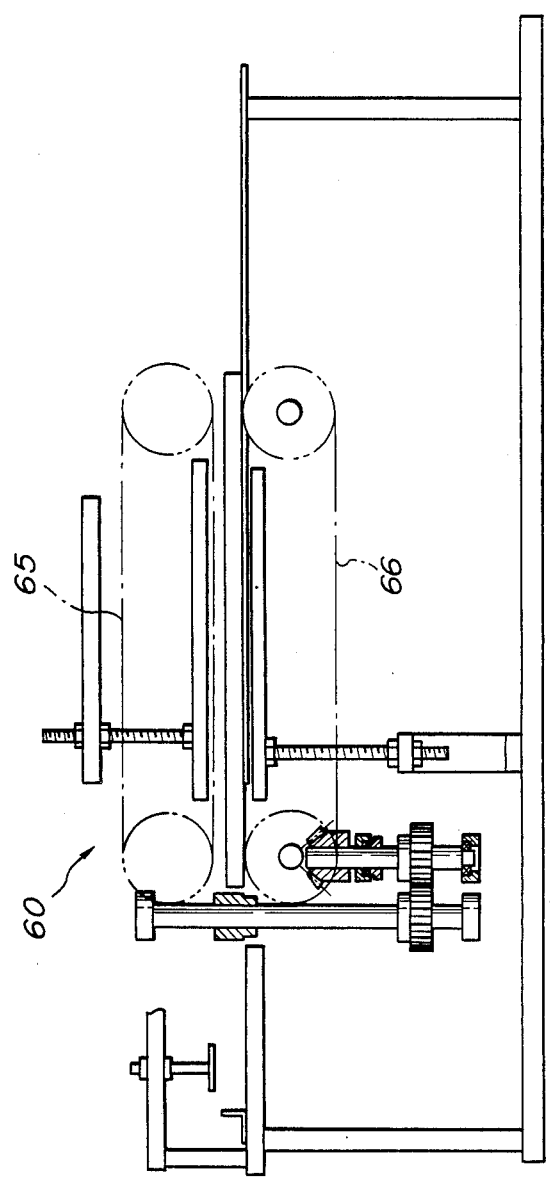

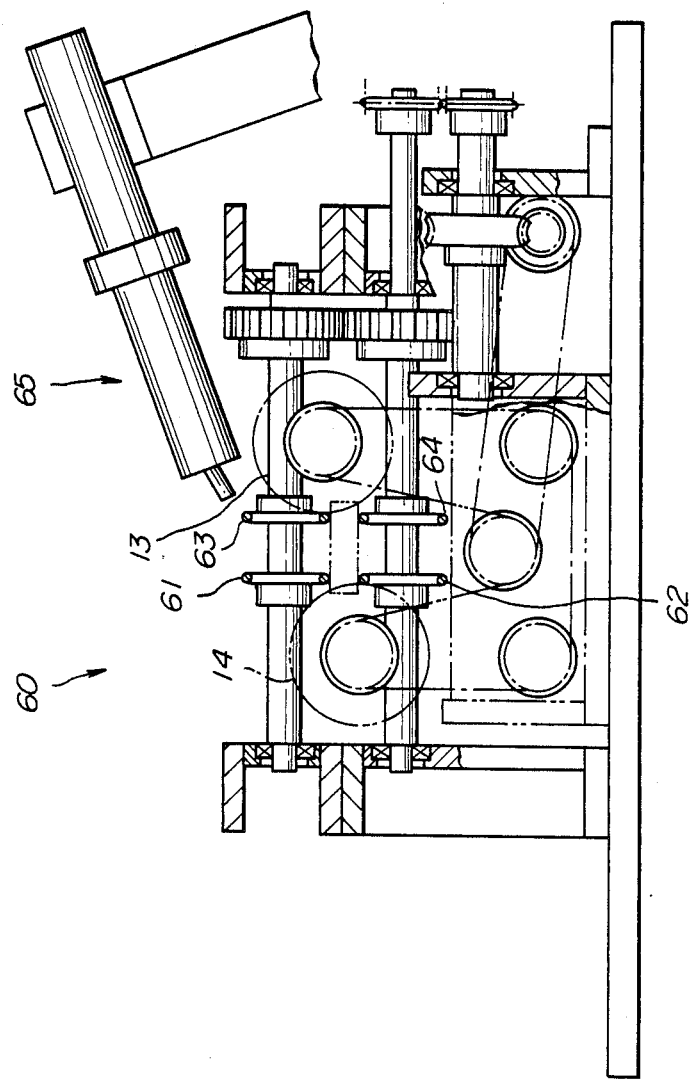

FILTER MEDIUM FORMING SYSTEM AND PROCESS

BACKGROUND OF THE INVENTION

1. Field of the Invention

This invention relates generally to a system and a process for forming a filter medium into a predetermined shape at high speed and with high accuracy, and more particularly to such a system and a process for preparing a filter medium for a filter element of the type in which pleats radially outwardly extend so that fluid to be filtered flows generally radially inwardly along the length of each pleat.

2. Description of the Prior Art

Sheet-type filter mediums such as filter papers have been used to separate and remove sold particles from liquid or gas in a variety of technical fields. Such filter mediums have been formed of various materials and formed into various shapes in accordance with requirements. In general, industrial filter mediums are formed into predetermined shapes and thereafter housed within casings to be used as filters. Such filters are required to uniformly filter fluid throughout the whole sections and to be high in filtering performance. For example, in an air filter for an automotive internal combustion engine, the filter medium such as filter paper is usually pleated and required to always maintain a predetermined shape as a filter element in order to exhibit a high filtering performance.

In conventional filter elements, when they are disposed within the casings after produced, they unavoidably slightly expand owing to their own elasticity, in which a part of the pleats formed in the filter medium expands. Accordingly a part of the filter medium becomes larger in distance between the adjacent pleats while another part becomes smaller. As a result, flow of fluid to flow through the filter element becomes ununiform.

In case of producing a small-sized filter to meet the requirement for a compact filter, it is fundamentally sufficient to make smaller the filter element including the filter medium; however, filtering area is unavoidably reduced merely by minimizing the filter element and the filter paper, thereby lowering filtering performance. In this regard, if a filter element including a multi-layered filter mediums is used for the purpose of obtain a compact filter having a larger filtering area, pressure differential increases between the upstream and downstream sides of the filter element, which requires applying a high pressure to the fluid to pass through the filter element. Additionally, this requires a large-sized pump to circulate the fluid through the filter element.

Accordingly in order to obtain a compact and high filtering performance filter, it is necessary to form many pleats in the filter medium to increase the filtering area. In this connection the shape and the distance of the pleats of the filter medium are determined in accordance with the sizes and the characters of solid particles to be filtered.

A conventional filter medium forming system to form a filter medium having many pleats is, for example, disclosed in Japanese Patent Publication No. 57-7806. In this filter medium forming system, score or bending lines are formed on an elongate filter medium by pressing two score line forming rollers onto the filter medium under the pressing action of two press rollers. Subsequently, the filter medium is flattened by two drive rollers and thereafter is compulsorily carried forward through a converging guide passage in which the filter medium is brought into frictional contact with a plurality of guide ribs whose height increases in the advancing direction of the filter medium.

However, the following difficulties have been encountered in this conventional filter medium forming system: When the filter medium is flattened by the drive rollers, the score or bending lines tend to be removed owing to elasticity of the filter medium so that the surface of the filter medium becomes flat. This increases resistance against bending or folding the filter medium along the score lines, thereby causing accidents in which the filter medium is compulsorily bent or folded at portions other than the score lines. Additionally, since the filter medium is compulsorily carried upon being in frictional contact with the guide ribs, the filter medium is caught by the guide passage, i.e., causing jamming of the filter medium during carrying of the filter medium particularly in case the filter medium is not folded at the right score lines, so that the filter medium cannot be smoothly carried. In such an event, the filter medium forming system must be stopped to remove the jammed filter paper and to adjust various parts of the system, and thereafter the system is restarted for the first time. Such troubleshooting requires a relatively long time. Additionally, the filter medium got off from the system partially expands owing to its own elasticity, so that the distances between pleats become ununiform as a whole.

Furthermore, the pleated filter medium folded at portions other than the right score lines are discarded as rejects in connection with quality control of products, thereby lowering yield rate of products. Thus, it has been eagerly desired to rightly and securely fold the filter medium at predetermined patterns thereby to form a pleated filter medium having a large number of pleats, at a high speed and with a high accuracy.

Moreover, since the filter element formed of the filter medium prepared by the above conventional filter medium forming system is so constructed as to maintain the shape of the filter element by the strength of the filter medium itself, the filter element tends to readily deform. Accordingly, the filter element is inconvenient in handling and has possibility of deforming in use. Additionally, the filter element expands when disposed within the casing after thus formed. In this state, the pleats formed in the filter medium also partially extend, thus forming a part having a larger distance between the pleats and another part having a smaller distance between the pleats. As a result, flow of fluid to pass through the filter medium unavoidably becomes ununiform.

U.S. Pat. No. 4,710,297 issued on Dec. 1, 1987 to Mitsutoshi Suzuki et al discloses a fluid filter including a filter element whose pleated filter medium has a plurality of radially outwardly extending pleats. Two sides or legs of each pleat are bonded to each other at the outer peripheral side to form an outer bonded section while one sides or legs of the adjacent pleats are bonded to each other at the inner peripheral side to form an inner bonded section, thereby forming a fluid path extending between the adjacent pleats along the length of each pleat. Another fluid path is of course formed from the upper side to the lower side of the filter medium. Thus, two kinds of fluid paths (or radial and vertical fluid paths) are formed. This filter element has a broader area through which fluid to be filtered passes. Additionally, fluid flows along the length of the pleats on the upper side of the filter medium and obliquely through the filter medium. This prevents abrupt change in flow direction of fluid to be filtered, thereby lowering flow resistance of fluid to be filtered.

In order to produce such a filter element, the filter medium is formed into a predetermined annular shape after adhesive is applied, taking account of the characteristics of the filter medium and the folding structure of the filter medium. However, an effective system for forming the filter medium with adhesive into a predetermined shape has hitherto not yet been proposed, therefore it has been impossible to automatically produce the filter element at high speed and with high precision.

SUMMARY OF THE INVENTION

It is an object of the present invention to provide an improved filter medium forming system and process by which a filter medium can be formed into a predetermined pleated shape even after adhesive is applied, at high speed and with high precision while solving the problems encountered in various conventional filter medium forming systems and processes.

An aspect of the present invention resides in a filter medium forming system which is comprised of a scoring device for forming linear depressions on opposite side surfaces of an elongate sheet-type filter medium. The scoring device is followed by an adhesive applying device for applying adhesive onto the opposite side surfaces of the filter medium at the edge sections. The adhesive applying device is followed by a pleating device for pleating the filter medium along the linear depressions to form a pleated filter medium having a plurality of pleats in which each pleat has two sides which are contiguous through each linear depression. The pleating device is followed by a pressing device for tightly contacting the predetermined sections of the sides of each pleat so that the predetermined sections are bonded with each other with the adhesive.

Another aspect of the present invention resides in a filter medium forming process comprised of the following steps in the sequence set forth: (1) forming linear depressions on opposite side surfaces of an elongate sheet-type filter medium; (2) applying adhesive onto the opposite side surfaces of the filter medium at the edge sections; (3) pleating the filter medium along the linear depressions to form a pleated filter medium having a plurality of pleats in which each pleat has two sides which are contiguous through the linear depression; and (4) tightly contacting the predetermined sections of the sides of each pleat so that the predetermined sections are bonded with each other with adhesive.

Thus, according to the present invention, the opposite sides of the pleats of the filter medium are tightly contacted with each other after adhesive is applied to the pleated filter medium, and therefore the filter medium is securely maintained in a predetermine shape which does not change throughout a long period of time after solidification of the adhesive. This prevents a filter element including the thus formed filter medium from causing ununiform filtering performance. Additionally, the filter medium forming system and process of the present invention is suitable for mass production and makes possible to form the flat filter medium into a predetermined pleated shape after applying adhesive at high speed and with high precision.

BRIEF DESCRIPTION OF THE DRAWINGS

The features and advantages of the filter medium forming system and process according to the present invention will be more clearly appreciated from the following description taken in conjunction with the accompanying drawings in which like reference numerals designate corresponding parts and elements, and in which:

FIG. 2 is a side view of the filter medium forming system of FIG. 1;

FIG. 8A is a side view of the regulating and carrying device of FIG. 8;

FIG. 9 is a side view of a cutting device of the filter medium forming system of FIG. 1;

FIG. 12A is a plan view, partly in section, of the regulating and carrying device of FIG. 8;

FIG. 13 is a cross-sectional view of the regulating and carrying device of FIG. 8;

DETAILED DESCRIPTION OF THE INVENTION

Figure 1:
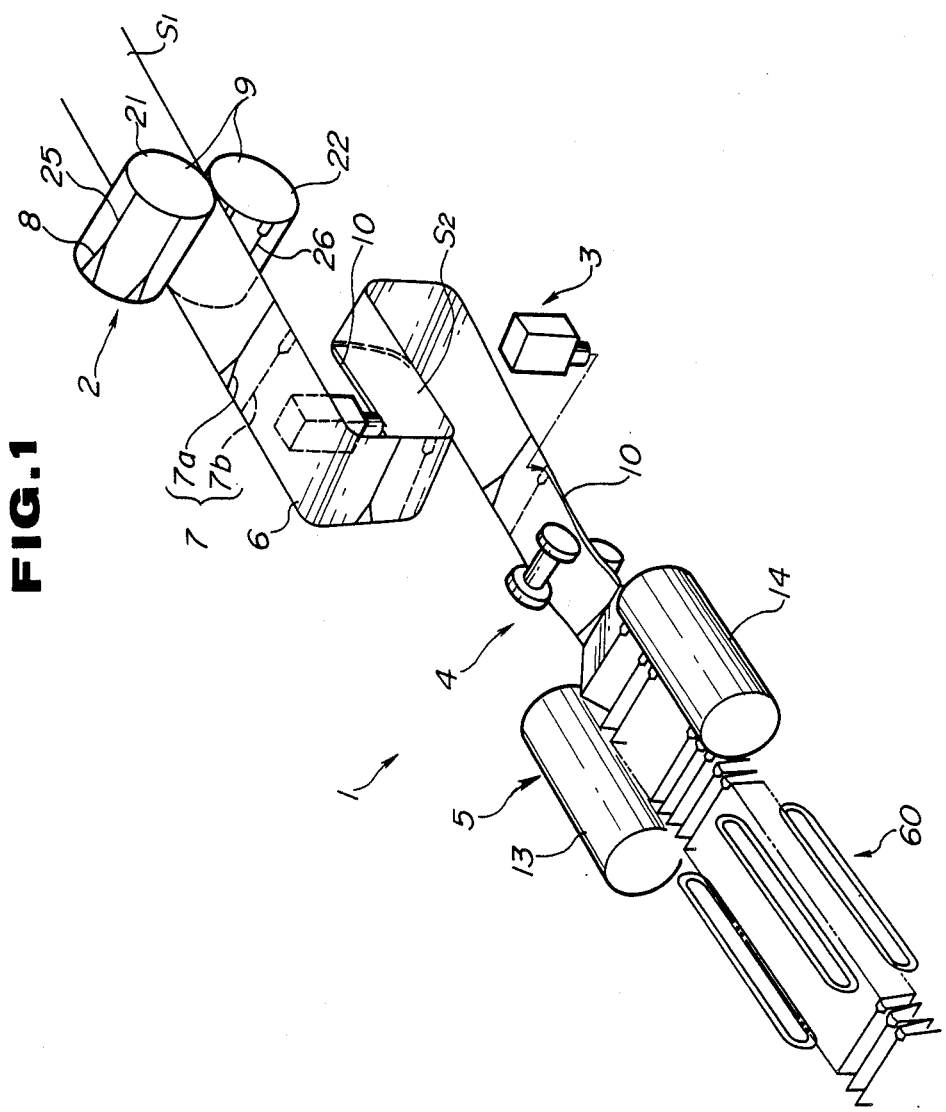
FIG. 1 is a schematic perspective view of an essential part of a filter medium forming system and process according to the present invention.

Referring now to FIGS. 1 to 14, an embodiment of a filter medium forming system according to the present invention is illustrated by the reference numeral 1. A filter medium M formed in the system 1 of this embodiment is, for example, used for a filter element for an air filter of an automotive internal combustion engine. The filter medium M is formed of a sheet-type filter material such as a filter paper. The filter medium M formed by the system 1 of the present invention substantially corresponds to ones disclosed in U.S. Pat. No. 4,710,297 issued Dec. 1, 1987 to Mitsutoshi Suzuki et al.

Figure 15:
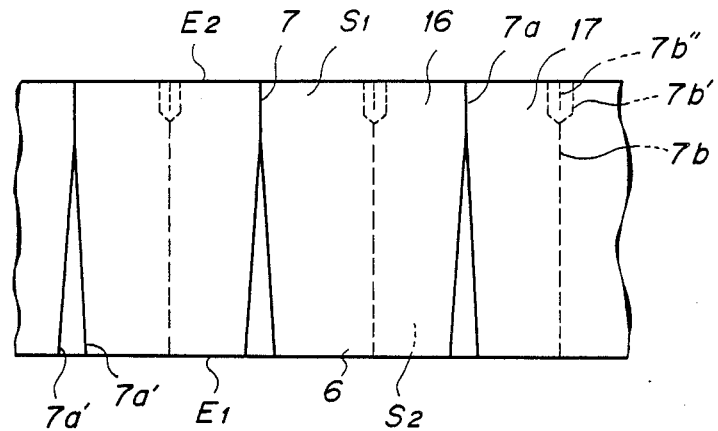
FIG. 15 is a plan view of a filter medium having linear depressions, used in the filter medium forming system of FIG. 1.
Figure 16:
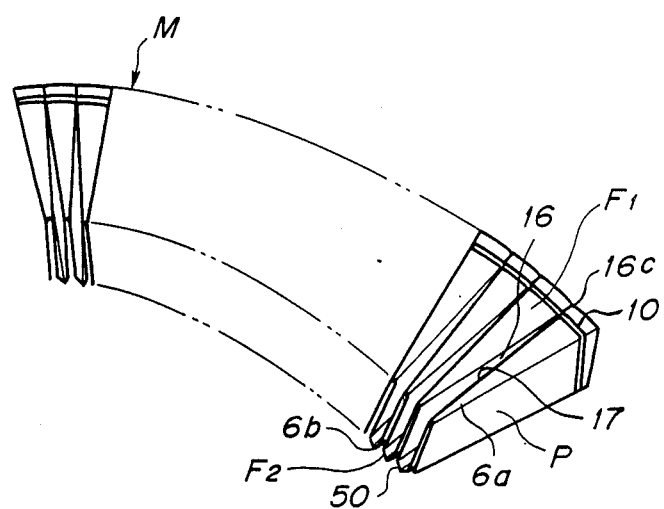
FIG. 16 is a fragmentary perspective view of a pleated filter medium corresponding to the filter medium of FIG. 15, as viewed from a direction of a filter element.
Figure 17:
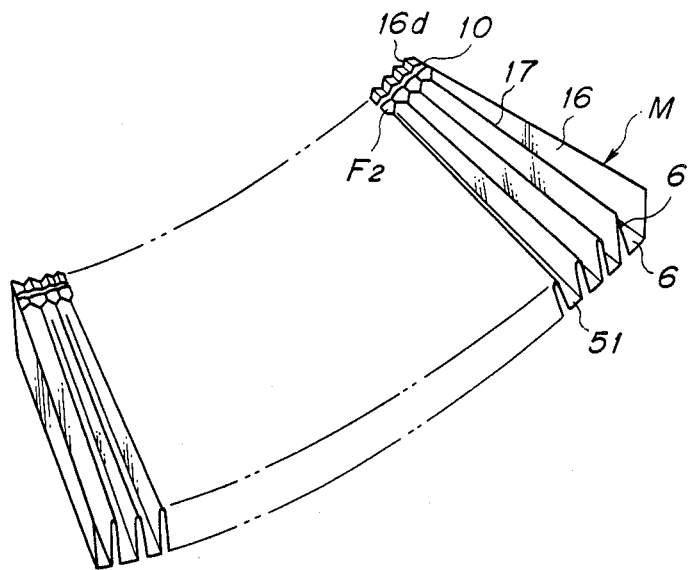
FIG. 17 is a fragmentary perspective view of the pleated filter medium of FIG. 16, as viewed from another direction of the filter element.

The filter medium M is shown as an example in FIGS. 16 and 17. The filter medium M of FIGS. 16 and 17 is formed of a filter paper 6 as shown in FIG. 15. The filter medium M includes a plurality of pleats P each of which has sloping sides or legs 16, 17 contiguous with each other through the top to form an upwardly-pointing pleat portion 6a. The sloping sides 16, 17 are further contiguous with each other through the bottom to form a downwardly-pointing pleat portion 6b. The outside of the upwardly-pointing pleat portion 6a forms a so-called ridge section, while the inside of the downwardly-pointing pleat portion 6b forms a so-called valley section. In this embodiment, referring to FIG. 16, the sloping sides 16, 17 of each downwardly-pointing pleat portion 6b are bonded with each other at its first or outer ends within a range from the bottom to a predetermined position thereby to form a first or outer bonded section 16c. Additionally, the sloping sides 16, 17 of each upwardly-pointing pleat portion 6a are bonded with each other at its second or inner ends within a range from the top to a predetermined position thereby to form a second or inner bonded section 16d. As a result, a generally triangular larger flat part $F_1$ is formed at the top of each upwardly-pointing pleat portion 6a, while a generally triangular smaller flat part $F_2$ is formed at the bottom between the adjacent upwardly-pointing pleat portions 6a or at the top of the downwardly-pointing pleat portion 6b as shown in FIG. 17.

It will be understood that, in use of the thus formed filter medium M, fluid to be filtered flows radially inwardly, i.e., from the inside space of the upwardly-pointing pleat section 6a through the sloping sides 16, 17 to the inside space of the downwardly-pointing pleat portion 6b. The filter medium M of FIGS. 16 and 17 is formed of the filter paper 6 shown in FIG. 15. The filter paper 6 is formed with a plurality of generally Y-shaped linear depressions or score lines 7a on the right side surface $S_1$, and a plurality of generally Y-shaped linear depressions or score lines 7b on the back side surface $S_2$. Each linear depression extends from a first edge $E_1$ to a second edge $E_2$ of the filter paper 6. All the linear depressions 7a, 7b are arranged parallel with each other in which each linear depression 7b is located between the two linear depressions 7a. As shown, a V-shaped linear depression portion 7a' of the Y-shaped linear depression 7a reaches the first edge $E_1$, while a generally V-shaped linear depression portion 7b' of the Y-shaped linear depression 7b reaches the second edge $E_2$. The linear depression 7a' incline an angle of 3 to 10 degrees relative a line perpendicular to the edges $E_1$, $E_2$ A short straight linear depression portion or score line 7b'' is formed within a range defined by the Y-shaped linear depression 7b' and reached to the second edge $E_2$. The linear depressions 7a, 7b are generally referred to as linear depressions 7 hereinafter.

Referring back to FIG. 1, the filter medium forming system 1 for forming such a filter medium M is comprised of a scoring or depression forming device 2. The scoring device 2 includes a pair of rotating drums 9 each of which is provided at its outer peripheral surface with radially outwardly protruding linear projections 8. The linear projections 8 extend axially of the drums 9 or perpendicularly relative to the length of the filter paper 6. The linear projections 8 have the shapes corresponding to the linear depressions 7 of the filter paper 6 shown in FIG. 15. The rotating drums 9 are pressed respectively on the right and back side surfaces $S_1$, $S_2$ of the belt-shaped filter paper 6, thereby to form the linear depressions 7 on the filter paper 6 as shown in FIG. 15.

Figure 4:
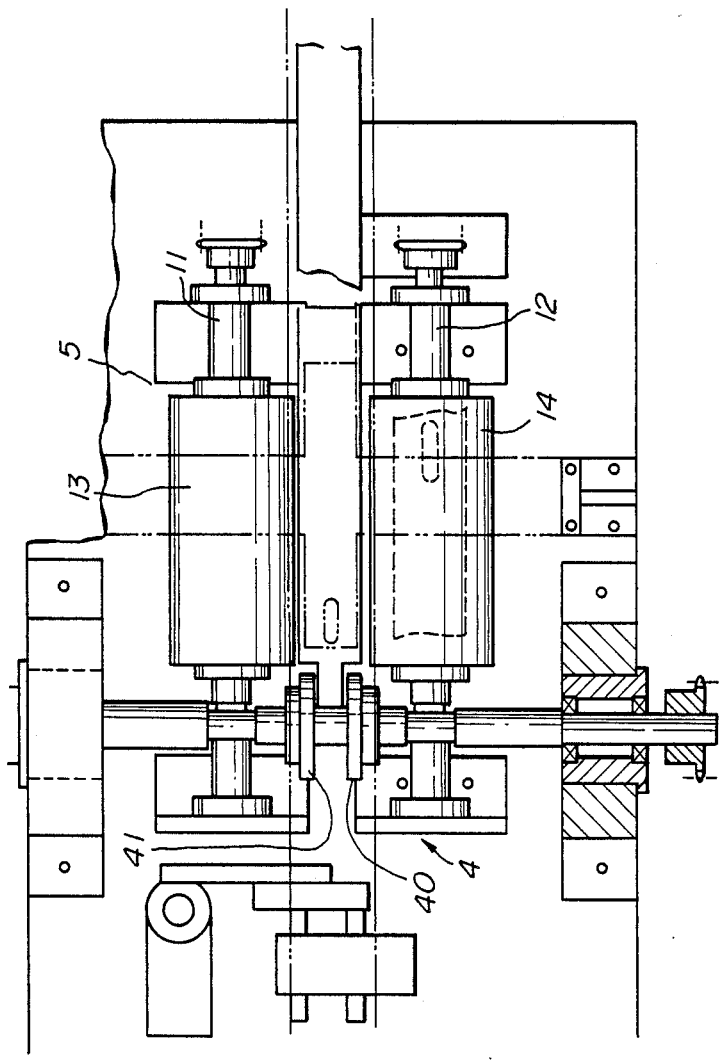
FIG. 4 is a plan view of an arrangement including a pleating device and a pressing device of the filter medium forming system of FIG. 1.
Figure 3:
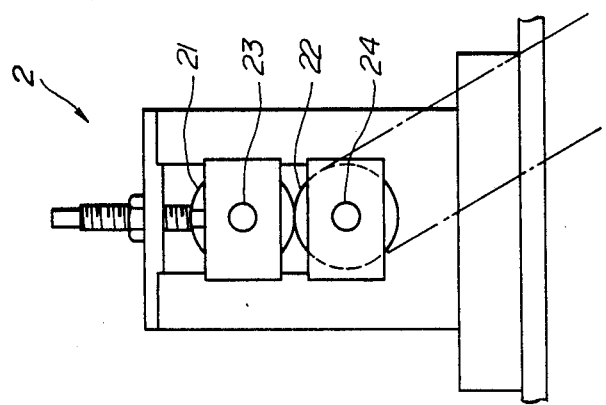
FIG. 3 is a side view of a scoring device of the filter medium forming system of FIG. 1.
Figure 5:
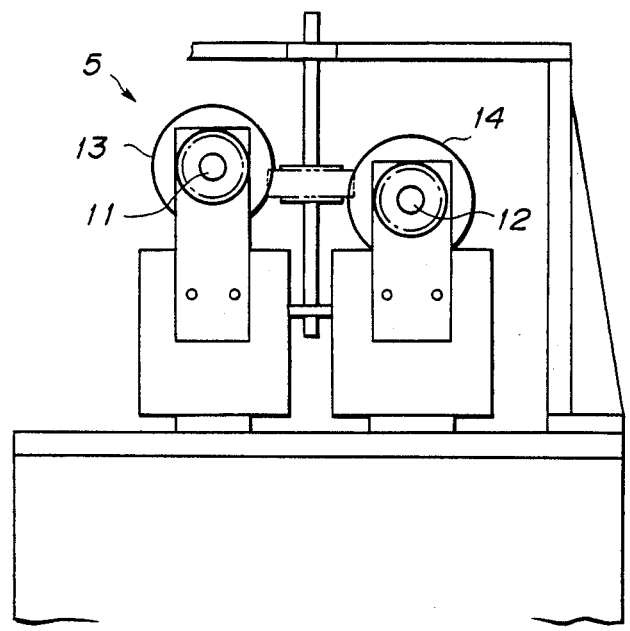
FIG. 5 is an end elevation of the pressing device of FIG. 4.
Figure 6:
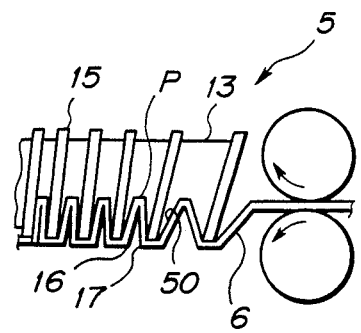
FIG. 6 is an enlarged illustration showing the function of the screw drums of the pressing device of FIG. 4.
Figure 11:
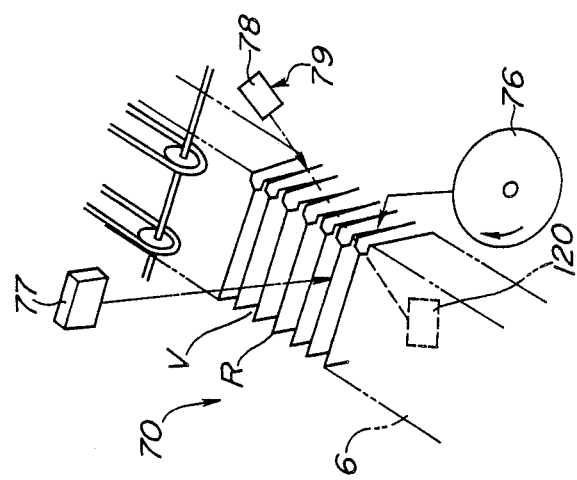
FIG. 11 is a fragmentary perspective view of the cutting device of FIG. 9.
Figure 14:
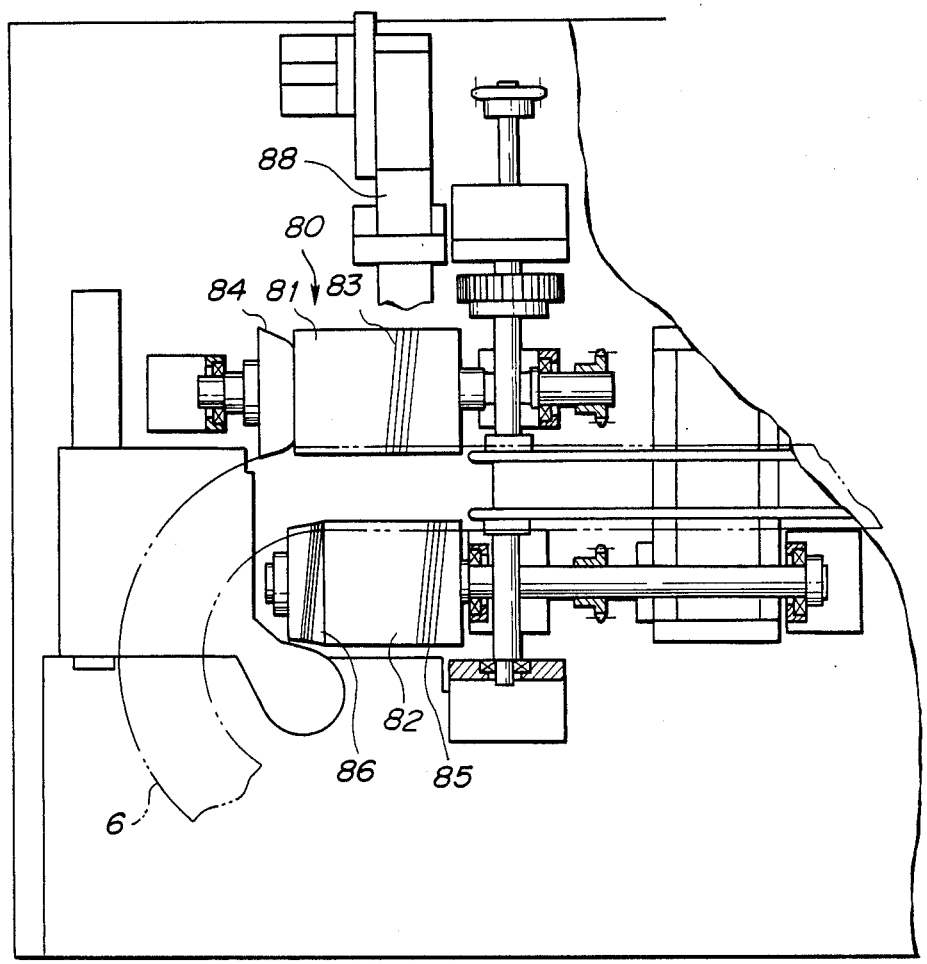
FIG. 14 is a plan view of a rounding device of the filter medium forming system of FIG. 1.
Figure 25:
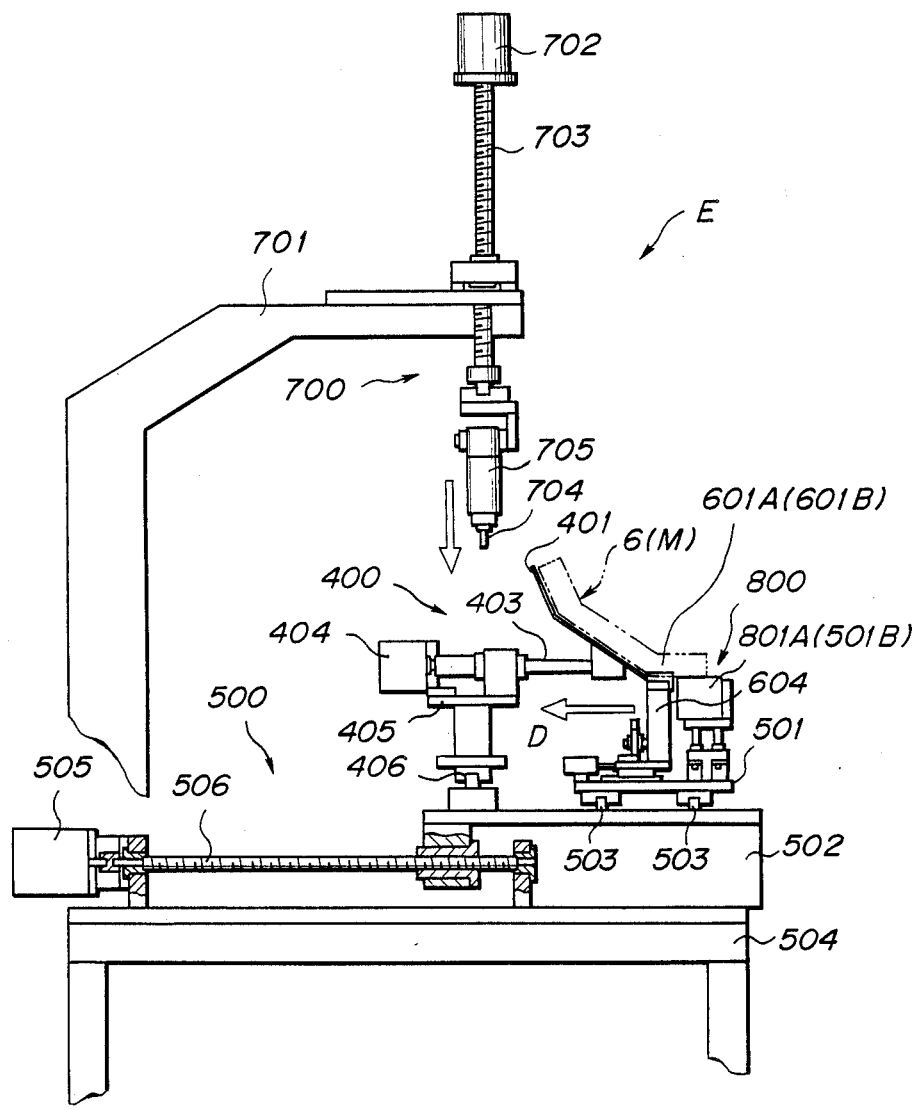
FIG. 25 is a side view of an endless filter medium forming device of the filter medium forming system of FIG. 1.

The scoring device 2 is followed by an adhesive applying device 3 in which thermoplastic adhesive is coated on the surface of the filter paper 6. The adhesive applying device 3 is followed by a pleating or folding device 4 which is arranged to be in contact with the filter paper 6 at a part in which no adhesive is coated in a manner to apply buckling force to the filter paper 6 in the advancing direction of the filter paper 6 thereby to fold the filter paper 6 at the linear depressions 7. The pleating device 4 is followed by a pressing device 5 as shown in FIGS. 4 and 5. The pressing device 5 in FIG. 4 includes two rotating shafts 11, 12 on which two screw drums 13, 14 are respectively mounted to rotate together with the rotating shafts 11, 12. The screw drums 13, 14 are located to engage respectively with the opposite edge sections (including the edges $E_1$, $E_2$) of the filter paper 6. As best shown in FIG. 6, each screw drum 13, 14 is formed with a continuous thread ridge 15 whose pitch decreases in the advancing direction of the filter paper 6. The threaded ridge 15 carries the pleats P of the filter paper 6, in which the filter paper 6 is further folded so that the pleats P become closer to each other thereby bonding the opposite faces of the adjacent sides 16, 17 of the pleats P. The pressing device 5 is successively followed by a regulating and carrying device 60, a measuring device 79 as shown in FIG. 11, a cutting device 70 as shown in FIG. 9, a rounding device 80 as shown in FIG. 14, and an endless filter medium forming device E as shown in FIG. 25.

As shown in FIG. 2, the filter medium forming system 1 comprised of a frame 20 which is provided its front with a roll (not shown) of the filter paper 6 of the band-shape is rotatably supported on a shaft (not shown) which is fixedly supported on the frame 20 or any other supporting device. The filter paper 6 drawn from the roll is fed to the scoring device 2. The rotating drum 9 of the scoring device 2 includes upper and lower scoring drums 21, 22 each of which is arranged to form the linear depressions 7 on the filter paper 6 which depressions 7 extend generally perpendicular to the direction of the length of the filter paper 6. The scoring drums 21, 22 are respectively mounted on shafts 23, 24 which are rotatably supported by the frame 20 and respectively located on the upper and lower sides of the filter paper 6, so that the scoring drums 21, 22 are positioned on the opposite sides of the filter paper 6 and in contact with the filter paper 6. The linear projections 8 include linear projections 25 formed on the peripheral surface of the upper scoring drum 21, and linear projections 26 formed on the peripheral surface of the lower scoring drum 22. The linear projection 25 has the shape corresponding to that of the linear depression 7a of the filter paper 6 as shown in FIG. 15, while the linear projection 26 has the shape corresponding to that of the linear depression 7b of the filter paper 6 as shown in FIG. 15. The linear projections 25, 26 are respectively pressed on the opposite side surfaces $S_1$, $S_2$ of the filter paper 6 to alternately form the linear depressions 7a, 7b which are spaced a predetermined distance from each other. Each linear depression 7(7a, 7b) extends generally in the direction of width of the filter paper 6. Accordingly, the filter paper 6 which has passed through between the scoring drums 21, 22 has the linear depressions 7a formed on the right side surface $S_1$ from the upper side and the linear depressions 7b formed on the back side surface $S_2$ from the lower side as shown in FIG. 15.

The thus scored filter paper 6 is carried to the adhesive feeding device 3. The adhesive applying device 3 is fixed on the frame 20 and includes a pair of adhesive feeders 31. The adhesive applying device 3 further includes a filter paper reversing arrangement 30 for changing the advancing direction of the filter paper 6. The filter paper reversing arrangement 30 includes two rollers 32, 33 which are rotatably supported on the frame 20 and positioned up and down to reverse the filter paper 6 in such a manner that the back side surface $S_2$ faces upward so that adhesive 10 is applied to the back side surface $S_2$ of the filter paper 6 by an adhesive feeding pipe or nozzle 35 forming part of the adhesive feeder 31. The filter paper reversing arrangement 30 further includes a roller 34 which is rotatably supported on the frame 20 to further reverse the filter paper 6 in such a manner as to expose the right side surface $S_1$ upward so that adhesive is applied to the right side surface $S_1$ of the filter paper 6 by another adhesive feeding pipe or nozzle 36 forming part of the adhesive feeder 31. As shown, the adhesive feeding pipe 35 is disposed between the rollers 33 and 34, while the adhesive feeding pipe 36 is disposed rearward of the roller 34 relative to the advancing direction of the filter paper 6. Each adhesive feeding pipe 35, 36 is supplied under pressure with molten and pressurized thermoplastic adhesive from an adhesive supply source (not shown). The adhesive feeding pipes 35, 36 are adapted to apply adhesive respectively on the back and right side surfaces $S_2$, $S_1$ of the filter paper 6 in such a manner as to form a linear adhesive ridge 10 extending through the generally V-shaped linear depressions $7b'$ on the back side surface $S_2$ and another linear adhesive ridge 10 extending through the V-shaped linear depression $7a'$ on the right side surface $S_1$.

The filter paper 6 formed with the linear adhesive ridges 10 is carried to the pleating device 4 supported to the frame 20. As shown in FIG. 4, the pleating device 4 includes two rollers 40, 41 which are mounted on a shaft (not numeral) extending perpendicular to the advancing direction of the filter paper 6. The rollers 40, 41 are parallel with and spaced from each other. Each of the rollers 40, 41 is in frictional contact with the surface of the filter paper 6 at the part provided with no adhesive in order to apply buckling force to the filter paper 6 in the advancing direction. The pleating device 4 is used in combination with the pressing device 5 located forward of the pleating device 4 relative to the advancing direction of the filter paper 6, in which the carrying speed of the pressing device 5 is lower than that of the pleating device 4 and therefore the filter paper 6 is pleated or folded along the linear depressions 7(7a, 7b) to form the pleats P under rotation of the rollers 40, 41.

Figure 7:
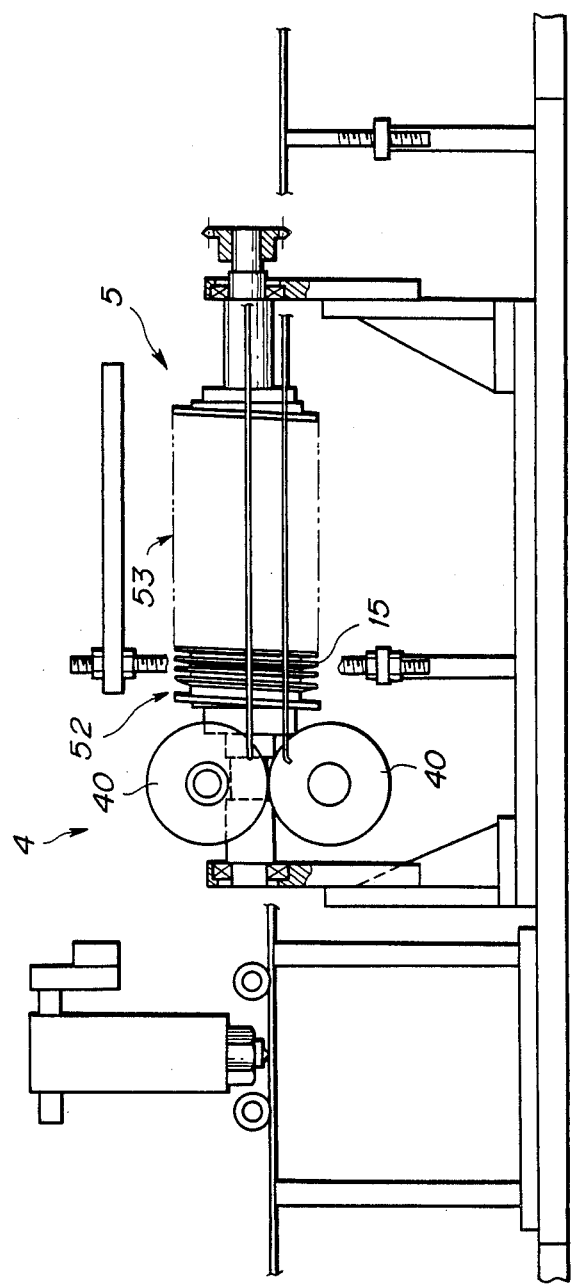
FIG. 7 is a side view showing the screw drums of the pressing device of FIG. 4.
Figure 8:
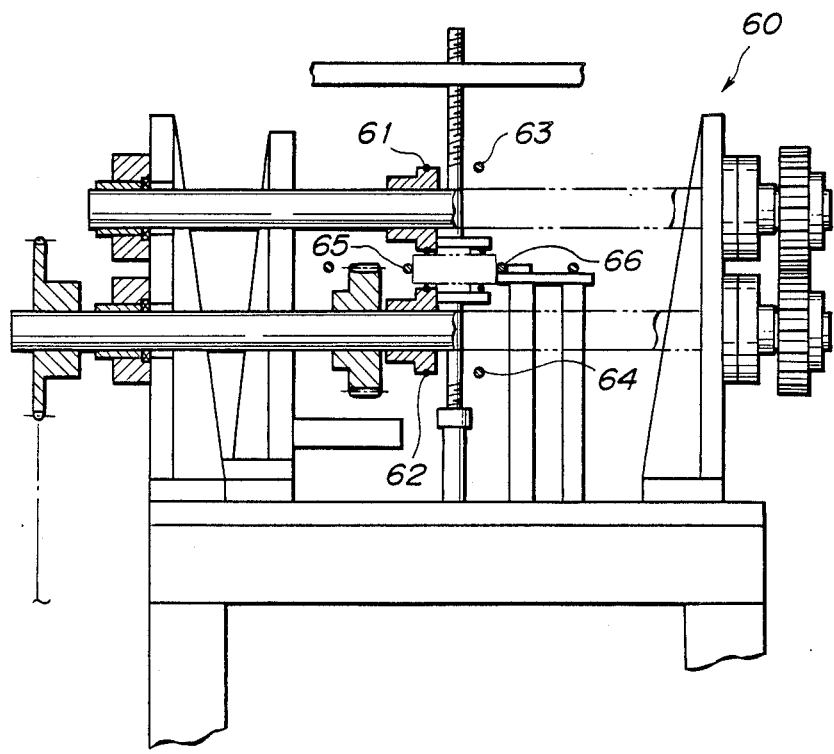
FIG. 8 is a cross-sectional view of a regulating and carrying device of the filter medium forming system of FIG. 1.

As shown in FIG. 5, the two screw drums 13, 14 are mounted respectively on rotating shafts 11, 12 which are rotatably supported on the frame 20 and different in height from each other relative t the frame 20. In other words, the screw drum 13 is located higher than the screw drum 14 relative to a horizontal plane passing through the frame 20. As illustrated in FIG. 6, the thread ridge 15 of the screw drum 13 is engaged or inserted into the valley section 50 between the adjacent pleats P, while the thread ridge 15 of the screw drum 14 is engaged or inserted into the valley section 51 between the adjacent pleats P as seen from FIG. 6 with reference to FIGS. 16 and 17. As shown in FIG. 7, each of the screw drums 13, 14 has a decreasing pitch section 52 and a constant pitch section 53. The decreasing pitch section 52 is axially aligned with and located rearward of the constant pitch section 52 relative to the advancing direction of the filter paper 6. The pitch of the thread ridges 15 of the decreasing pitch section gradually decreases in the advancing direction of the filter paper 6. The constant pitch section 52 is constant in pitch of the thread ridges 15 thereof. The opposite sides 16, 17 of each pleat P of the filter paper 6 are brought into press contact with each other to be tightly bonded to each other with the linear adhesive 10.

The thus pleated and bonded filter paper 6 is thereafter carried to the regulating and carrying device 60. As shown in FIGS. 8, 8A, 12, 12A and 13, the regulating and carrying device 60 includes endless drive belts 61, 62, 63, 64, 65, 66 which are respectively in frictional contact with the upper, lower, and opposite side faces of the pleated and bonded filter paper 6 thereby to carry the filter paper 6 in its advancing direction, so that the filter paper 6 can move smoothly. The regulating and carrying device 60 includes an adhesive hardening promoting apparatus 65 for ejecting cool air at 5° C. and hot air at 80° C. to the carried filter paper 6. The thermoplastic adhesive 10 can be hardened for a short period of time upon being subjected to cool air and hot air.

Thus, the regulating and carrying device 60 functions to promptly harden the adhesive to maintain the filter paper 6 in a predetermined shape in order to prevent the bonded pleat portions from peeling off at the bonded sections 16c, 16d. This prevents the pitch of the pleats P of the filter paper 6 from becoming ununiform since the adhesive 10 cannot completely harden merely under pressing by the pressing device 5 including the screw drums 13, 14. The moving speed of the drive belts 61, 62, 63, 64, 65, 66 are controllable by changing the revolution speed of a motor for driving the belts or operating a clutch and a decelerator between the belts and the motor, thereby regulating the pitch of the pleats P of the pleated filter paper 6.

Figure 10:
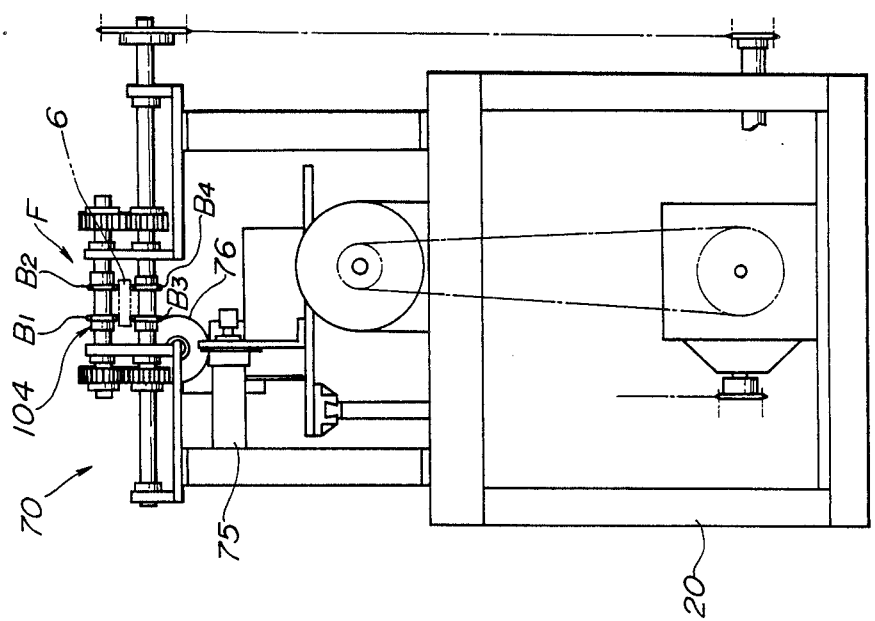
FIG. 10 is an end elevation of the cutting device of FIG. 9.
Figure 12:
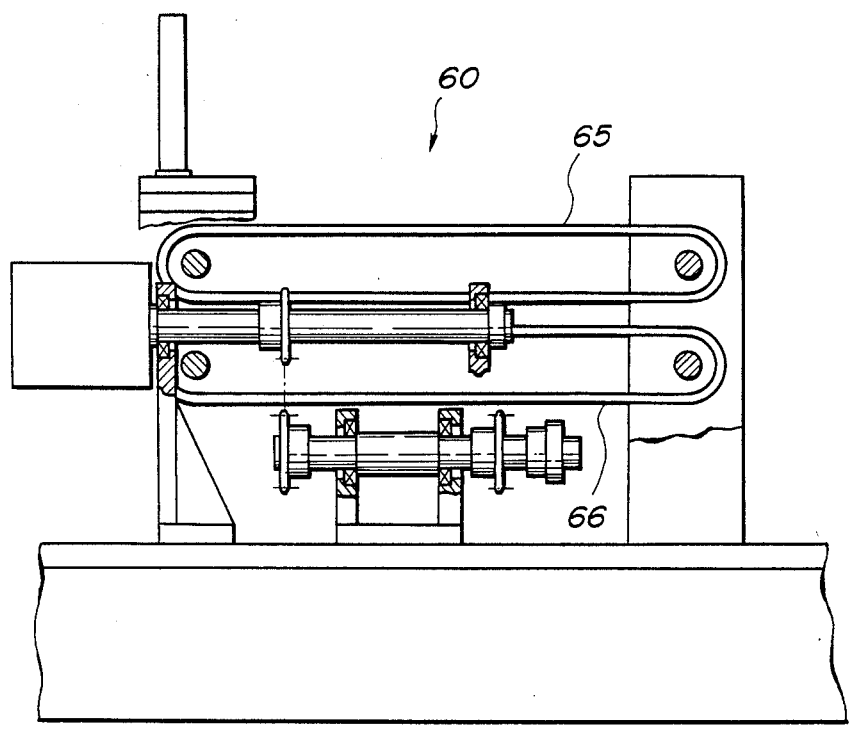
FIG. 12 is a side view of the regulating and carrying device of FIG. 8.

The filter paper 6 discharged from the regulating and carrying device 60 is carried to the cutting device 70 as shown in FIGS. 9 and 10. The cutting device 70 functions to cut the pleated filter paper 6 to have a predetermined length and includes a rotatable disc blade 76 driven by a blade motor B. A normal-and-reverse rotation clutch 66 is drivably connected to the motor 71 to change the direction of rotation transmitted from the motor 71 to a clutch brake 67 drivably connected to the clutch 66. The clutch brake 67 has a drive shaft (not shown) to which a feed screw 72 is connected, so that the feed screw 72 can rotate in the opposite rotational directions by rotational force from the motor 71. A movable support mount 73 is engaged with the feed screw 72 to be movable along the feed screw 72 with rotation of the feed screw 72. The cutting device 70 further includes an air or pneumatic cylinders 74, 75 mounted on the movable support mount 73 and operatively connected to the blade 76 in such a manner that the blade 76 is moved vertically by the air cylinder 74 and horizontally by the air cylinder 75.

An optical sensor 77 is provided to sense the reflected light from the top of the pleats P thereby to detect the pleats P of the pleated filter paper 6. Additionally, another optical sensor 78 is provided to sense the light passing through a space between the adjacent pleats P of the pleated filter paper 6. The optical sensor 78 is connected to a counter (not shown) for counting the number of the pleats P of the filter paper 6. The optical sensors 77, 78 constitute part of the measuring device 79 and located forward of the cutting device 70 relative to the advancing direction of the filter paper 6. Additionally, a feeding device F shown in FIGS. 9 and 10 is located rearward of the blade 76 relative to the advancing direction of the filter paper 6. The feeding device F includes two upper endless drive belts B1, B2 and two lower endless drive belts B3, B4. The upper endless drive belts B1, B2 are in frictional contact with the upper face of the pleated filter 6, while the lower endless drive belts B3, B4 are in frictional contact with the lower face of the pleated filter paper 6. Accordingly, the pleated filter paper 6 is carried toward the blade 76 when the belts B1, B2, B3, B4 are driven.

With the thus arranged cutting and measuring devices 70, 79, when a predetermined number of the pleats P of the pleated filter paper 6 has been counted under the action of the sensor 78, the motor 71 is operated to move the blade 76 on the support mount 73 in the same direction as the advancing direction of the filter paper 6 at the same speed as the moving speed of the filter paper 6. Simultaneously the blade 76 is rotated by the motor M. At this time, the air cylinders 74, 75 are operated so that the blade 76 moves vertically upwardly to reach a predetermined position and then moves in the direction perpendicular to the advancing direction of the filter paper 6 or rightward in FIG. 10, thereby cutting the filter paper 6 along a line (not shown) perpendicular to the opposite edges $E_1$, $E_2$ of the filter paper 6 (See FIG. 15). When the cutting of the filter paper has been completed, the blade 76 is restored to its original position located on low and left side and forward of the position at which cutting is completed, for preparation of next filter paper cutting.

The thus cut filter paper 6 is carried to the rounding device 80 to be rounded for preparation of forming an endless or annular filter medium. The rounding device 80 includes two screw drums 81, 82 which are located spaced from each other in such a manner that the axes of them extend parallel with each other. The screw drum 81 includes a cylindrical section 83, and a frustoconical section 84 which is enlarged in diameter in the advancing direction of the filter paper 6. The frustoconical section 84 is connected to and axially aligned with the cylindrical section 83. The cylindrical section 83 are formed with thread ridges at a constant pitch, while no thread ridge is formed on the surface of the frustoconical section 84. The screw drum 82 includes a cylindrical section 85 and a frustoconical section 86 which decreases in diameter in the advancing direction of the filter paper 6. The frustconical section 86 is connected to and axially aligned with the cylindrical section 85. The cylindrical section has thread ridges at a constant pitch. The frustoconical section 86 has thread ridges at a pitch smaller than that of the cylindrical section 85. The thread ridges of the screw drums 81, 82 are in engagement with the valley sections each formed between the pleats P of the pleated filter paper 6. In this embodiment, the screw drum 81 engages with one side of the pleated filter paper 6 which side corresponds to the edge $E_1$ of the filter paper 6 as shown in FIG. 15, while the screw drum 82 engages with the other side of the pleated filter paper 6 which side corresponds to the edge $E_2$ of the filter paper 6 as shown in FIG. 15. Thus, during passing of the pleated filter paper 6 through the rounding device 80, the pleated filter paper 6 is formed into a predetermined curved shape having a constant curvature. Additionally, a hot air ejecting device 88 is provided to eject hot air onto the pleated filter paper 6 between the screw drums 81, 82, so that the adhesive 10 on the filter paper 6 is temporarily softened to facilitate deformation of the pleated filter paper 6. The thus deformed or rounded pleated filter paper 6 is carried to the endless filter medium forming device E by which the opposite cut end sections of the pleated filter paper 6 are bonded with each other to form the filter paper 6 into the endless or annular shape.

Hereinafter further detailed discussion will be made for the cutting device 70, the rounding device 80, and the endless filter medium forming device E.

Figure 18:
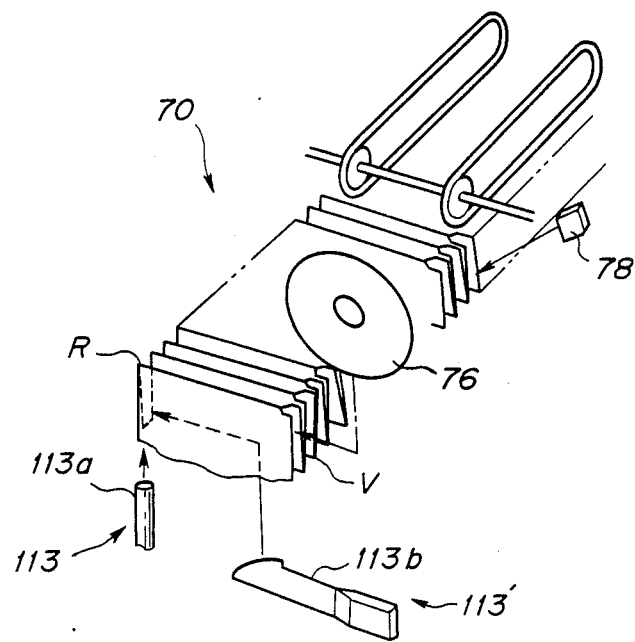
FIG. 18 is a perspective view similar to FIG. 11 but showing the cutting device in detail.
Figure 19A:
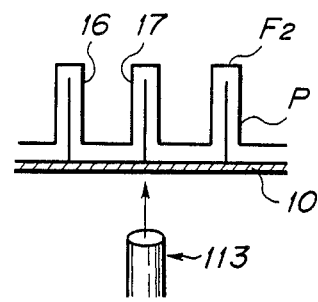
FIG. 19A and 19B are fragmentary sectional views of the pleated filter medium, showing the function of a heating device used in combination with the cutting device of FIG. 18.
Figure 19B:
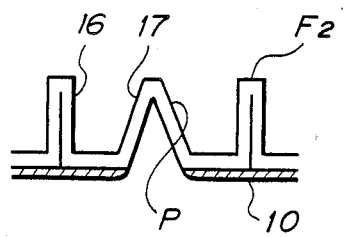

In the cutting device 70, as shown in FIG. 9, the air cylinders 74, 75 constitute a blade moving device 110 for displacing the blade 76 vertically or horizontally relative to the frame 20. The sensor 77 is adapted to detect the position of the ridge and valley sections of the pleated filter paper 6. As shown in FIG. 19A, a heating device 113 is provided to soften the adhesive 20 on the filter paper 6 to be cut. In this embodiment, the heating device 113 includes a hot air ejection tube 113a arranged to eject hot air to the adhesive 20 as shown in FIG. 19B, in which FIG. 19A indicates a state before ejection of hot air while FIG. 19B indicates a state after ejection of hot air in which the bonding section 16c (16d) between the pleats P is peeled off or separated. The hot air ejection tube 13a may be replaced with a hot knife indicated by the reference numeral 13' as shown in FIG. 18. The hot knife 13' has a heated edge 13b which is to be inserted through the adhesive 10 into between the sloping sides 16, 17 of the pleat P to cut the adhesive 10 and separate the sides 16, 17 from each other.

Figure 20:
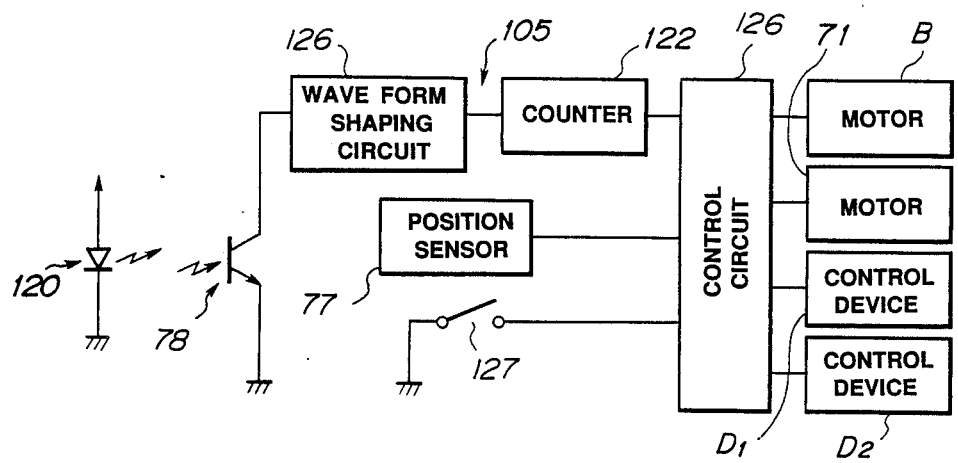
FIG. 20 is a block diagram showing an electric circuit for the cutting device of FIG. 18.

As shown in FIGS. 11 and 20, the sensor 78 for measuring the length of the pleated filter paper 6 forms part of a counting arrangement 105 adapted to count the pleats P of the pleated filter paper 6. The length measuring sensor 78 includes a light emitting element 120. The length measuring sensor 78 is connected to a counter 122 which is adapted to feed a driving signal to a driving device 107 and the blade moving device 110. The driving device 107 includes the motor 71, the normal-and-reverse rotation clutch 66, the clutch brake 67, the feed screw 72, and an inner screw member 125 which is fixed to the support mount 73 and formed with an inside screw engaged with the feed screw 72.

The air cylinder 74 of the blade moving device 110 is so arranged and positioned to move the blade 76 vertically and in the direction of coming near and remote from the passage 103 (FIG. 9) of the filter paper 6. The air cylinder 75 of the blade moving device 110 is so arranged and positioned to move the blade 76 horizontally or in the direction across the filter paper passage 103. The driving device 107 is arranged to move the support mount 73 at the same speed as the carrying speed of the filter paper 6.

The filter paper passage 103 is defined by a guiding arrangement 104 as shown in FIGS. 9 and 10. The guide arrangement 104 includes the endless drive belts $B_1$, $B_2$, $B_3$, $B_4$ which carries and guides the pleated filter paper 6 toward the blade 76 of the cutting device 70. The counting device 105 includes a waveform shaping circuit 126 connected between the sensor 78 and the counter 22. The counter 122 is connected to an input port of a control circuit 126 having output ports connected respectively to the blade motor T, the motor 71, the electric control device (not identified) for the air cylinder 74, and the electric control device (not identified) for the air cylinder 75. Two further input ports of the control circuit 126 are respectively connected to a limit switch 127 and the position sensor 77. The limit switch 127 is adapted to be operated when the blade 76 comes to a predetermined position after the filter paper 6 is cut. The support mount 73 supports the blade motor T and the blade moving device 110 and is moved in the opposite directions along a guide 132 shown in FIG. 9 under normal and reverse rotation of the feed screw 72. The position sensor 77 is constituted of a photoelectric coupler of the light reflecting type, including light emitter and receiver. The position sensor 77 functions to detect the top of the ridge section R and the bottom of the valley section V of the pleated filter paper 6.

With the thus arranged cutting device 70, when the pleated filter paper 6 is carried and guided by the guide arrangement 104 toward the cutting blade 76, the counting device 105 counts the number of the ridge section R and the valley section V of the pleated filter paper 6. When the counting device 105 generates a predetermined number of pulses, the counter 122 feeds a signal to the control circuit 126, so that the control circuit 126 provides the respective operating signals to the blade motor T, the motor 71, the electric control device $D_1$ of the air cylinder 74, and the electric control device $D_2$ of the air cylinder 75. Accordingly, the support mount 73 is moved through the feed screw 72 in the same direction and at the same speed as the moving filter paper 6 under the action of the motor 71. Simultaneously the blade 76 is rotated or driven by the blade motor T and moved upwardly upon extension of the air cylinder 74 and horizontally across the filter paper 6 upon extension of the air cylinder 75. As a result, the pleated filter paper 6 is precisely cut along the linear depressions 7 in FIG. 15 to have a predetermined length and a predetermined number of the pleats P. After cutting by the blade 76, a part of the blade motor T or the other section is brought into contact with the limit switch 127 to operate the limit switch 127. Then the limit switch 127 feeds a signal to the control circuit 126, thereby stopping the rotation of the blade motor T. Simultaneously the blade 76 is restored to its original position under contraction of the air cylinders 74, 75. Additionally, the support mount 73 is restored to its original position under the reverse rotation of the feed screw 72.

In this embodiment, the position sensor 77 for detecting the position of the ridge and valley sections R, V of the pleated filter paper 6 may be omitted since the pleated filter paper 6 has a predetermined length between an observation point at which the sensor 78 is positioned and a cutting position at which the cutting blade 76 is operated, in a case where the density of the ridge and valley sections R, V of the pleated filter paper 6 is constant. Further it will be understood that the heating device 113 for softening the adhesive 10 on the filter paper 6 may be omitted.

Figure 21:
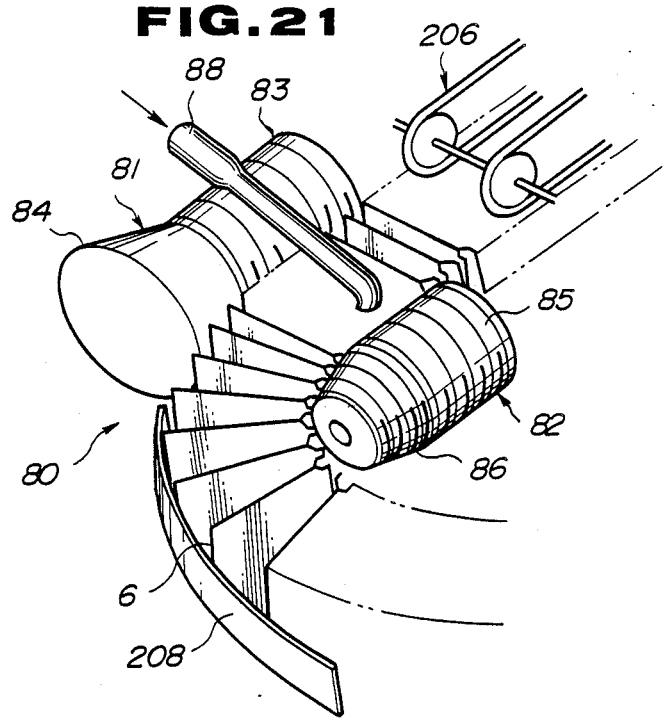
FIG. 21 is a perspective view of the rounding device of FIG. 14.
Figure 22:
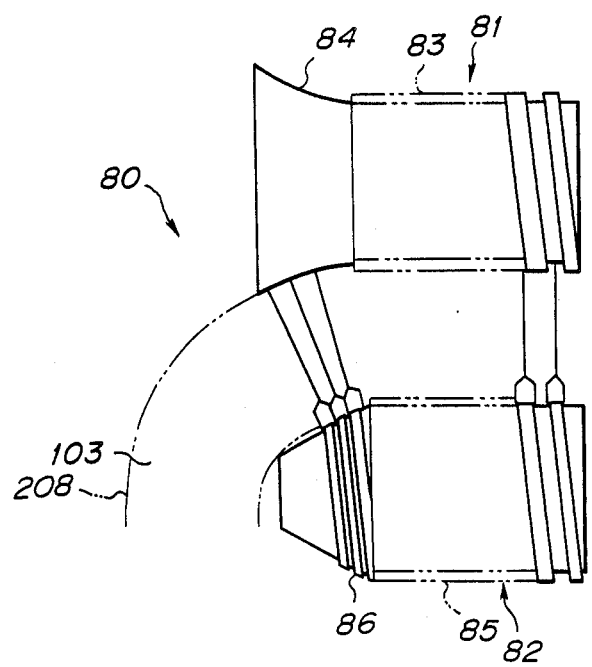
FIG. 22 is a schematic plan view of the cutting device of FIG. 21.

In the rounding device 80, as shown in FIGS. 14, 21 and 22, the screw drum 81 serves as a high speed carrying device for carrying the pleated filter paper 6 at a high speed, while the screw drum 82 serves as a low speed carrying device for carrying the pleated filter paper 6 at a low speed. The screw drums 81, 82 are rotated usually at the same speed and so located that their axes are parallel with each other. It will be understood that the circumferential speed of each screw drum 81, 82 is different depending upon the radius of the screw drum. The screw drums 81, 82 may be rotated at different angular velocities from each other. A guide member 208 is provided forward of the screw drums 81, 82 as shown in FIGS. 21 and 22. The guide member 208 is formed of a curved metal plate and has a curvature corresponding to that of the resultant filter medium M. The heating device 88 of this embodiment is arranged to eject hot air thereby to heat the adhesive 10 at 40° C.

With the thus arranged rounding device 80, the pleated filter paper 6 fed from the carrying device 206 is introduced or guided into between the screw drums 81, 82, in which the thread ridges of the screw drums 81, 82 are brought into engagement with or inserted into between the pleats P. In this state, hot air is blown onto the filter paper 6 from the heating device 88 thereby to soften the adhesive 10. Simultaneously the filter paper 6 is rounded under the action of the threaded frustoconical sections 84, 86 of the screw drums 81, 82, in which the pitches of the pleats at the outer periphery (corresponding to the edge $E_1$ in FIG. 15) and at the inner periphery (corresponding to the edge $E_2$ in FIG. 15) of the pleated filter paper 6 are regulated. Then the filter paper 6 is guided by and carried along the guide member 208 to be effectively formed into the circular shape.

Figure 23:
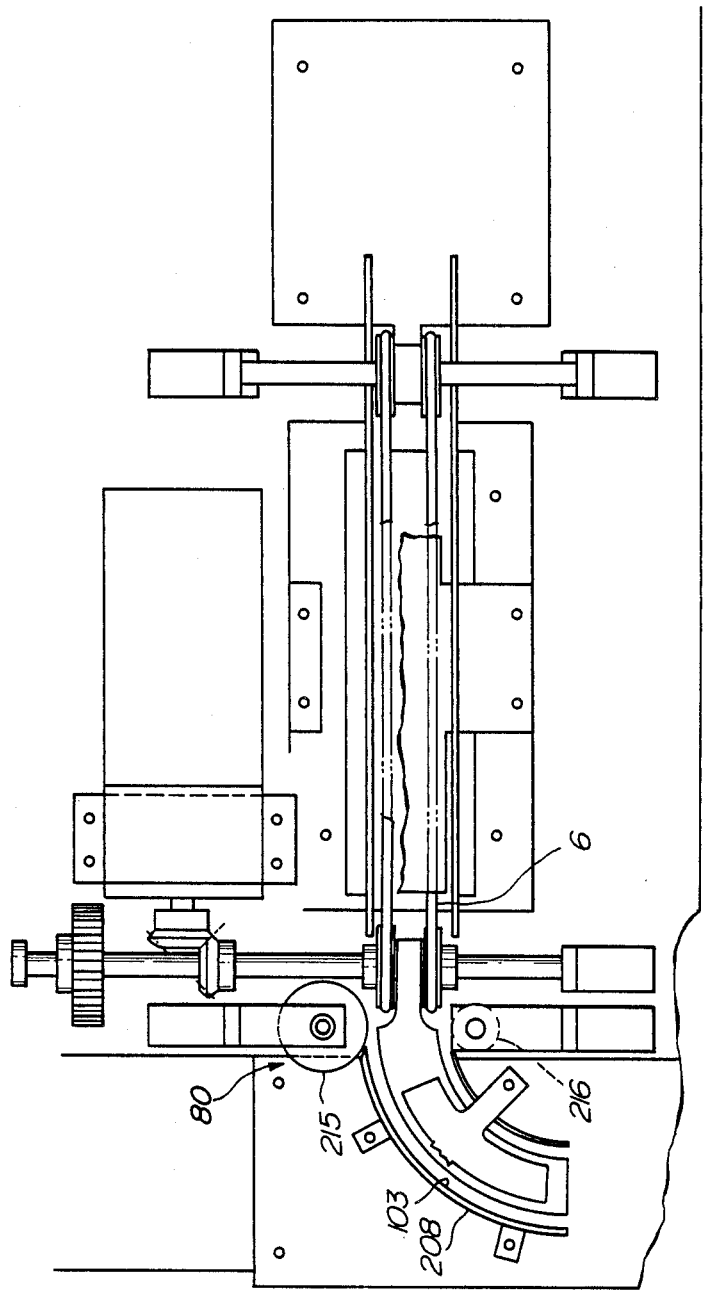
FIG. 23 is a plan view showing another example of the rounding device which can be used in place of that of FIG. 21.
Figure 24:
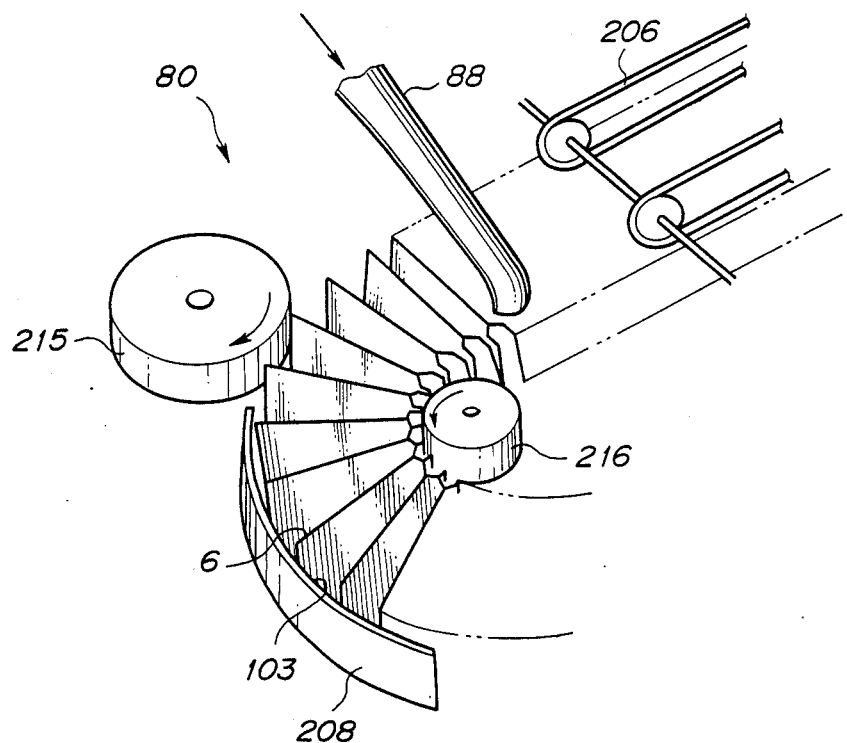
FIG. 24 is a perspective view of the rounding device of FIG. 23.

FIGS. 23 and 24 show another example of the rounding device 80, in which a drive roller 215 serves as the high speed carrying device while a drive roller 216 serves as the low speed carrying device. The drive roller 215 is engaged with the outer periphery (corresponding to the edge $E_1$ in FIG. 15) of the pleated filter paper 6 and has an outer diameter larger than that of the drive roller 216. The drive roller 216 is engaged with the inner periphery (corresponding to the edge $E_2$ in FIG. 15) of the pleated filter paper 6. The drive rollers 215, 216 are rotated usually at the same angular velocity. The drive rollers 215, 216 may be rotated at different angular velocities from each other. It will be appreciated that the circumferencial speed of the drive roller 215 is higher than that of the drive roller 216. Accordingly it will be understood that, also with the arrangement of FIGS. 23 and 24, the pleated filter paper 6 can be formed annular as in the example of FIGS. 14, 21 and 22.

Figure 26:
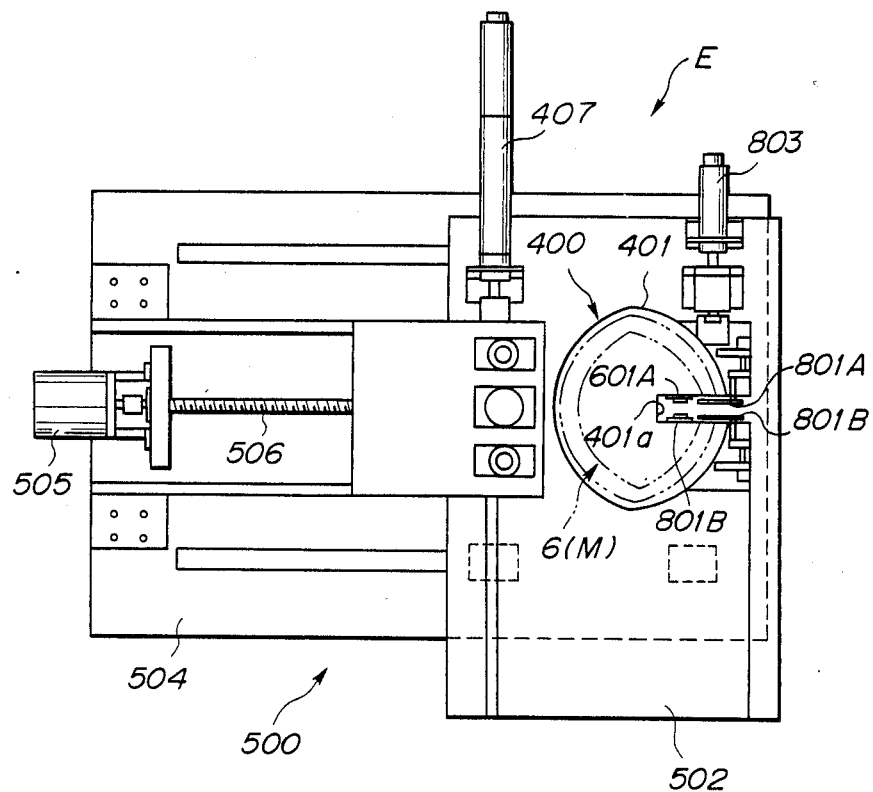
FIG. 26 is a plan view of the endless filter medium forming device of FIG. 25.

Referring to FIGS. 25 to 34, the endless filter medium forming device E will be discussed in detail hereinafter. As shown in FIGS. 25 and 26, a support device 400 includes a disc-shaped working dish 401 which is mounted on a mount 405. The working dish 401 is drivably connected through a shaft 403 to an actuator 404 on the mount 405 in such a manner as to be movable in the rightward and leftward in FIG. 25 or in the direction of length of the drive shaft 403 under the drive of the actuator 404. The mount 405 is movable along a guide rail 406 under drive of an air or pneumatic cylinder 407 as shown in FIG. 26, so that the mount 405 can move in the direction perpendicular to the direction of length of the drive shaft 403.

Figure 27:
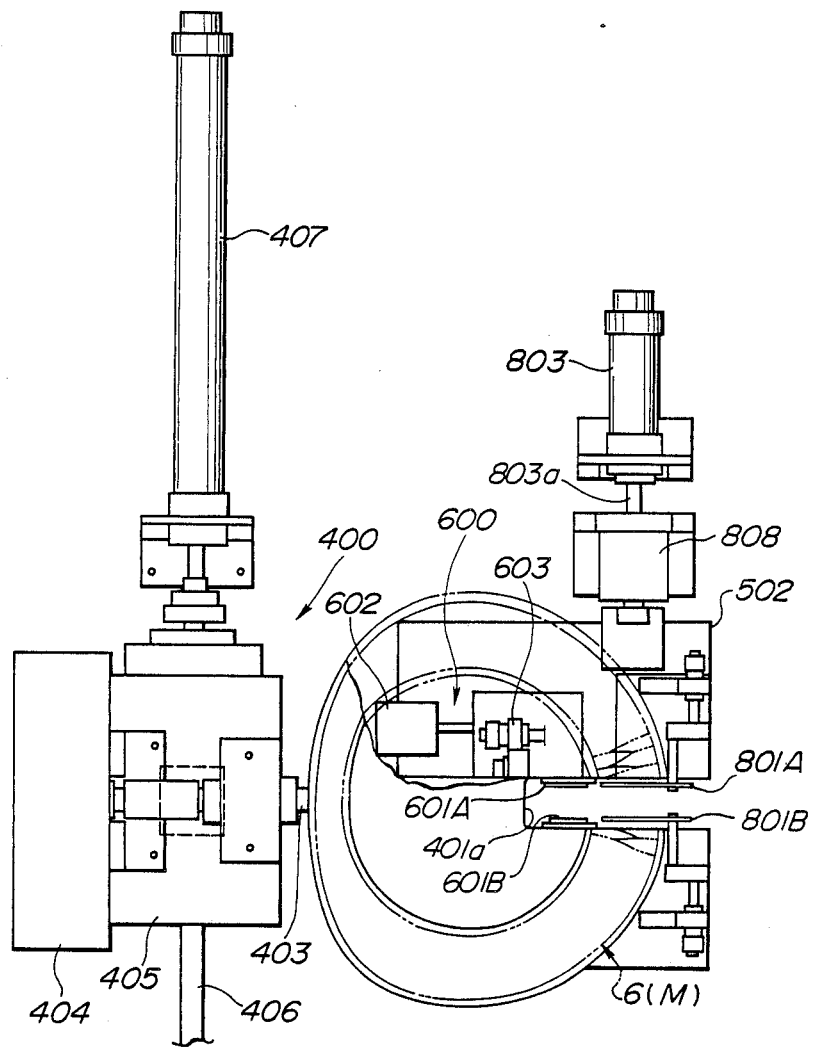
FIG. 27 is a plan view, partly in section, of a locating device forming part of the endless filter medium forming device of FIG. 25.

As shown in FIG. 27, a locating device 600 is provided below the working dish 401 in order to locating the opposite end sections 11A, 11B (in FIG. 32) to be bonded with adhesive 10, respectively at predetermined positions on the working dish 401. The locating device 600 includes two locating plates 601A, 601B which are disposed on a mount 604. An actuator 602 such as an air or pneumatic actuator 602 is drivingly connected through a power transmission device 603 to the locating plates 601A, 601B in such manner that the locating plates 601A, 601B are moved in the directions of approaching to and separating from each other. The working dish 401 is formed at a part thereof with a cutout 401a (in FIG. 27) within which the locating plates 601A, 601B move, thus operating a pressing device 800.

The mount 400 and the locating device 600 are supported on a middle table 502 of a driving device 500. The middle table 502 can be moved in the direction of length of the feed screw 506 above a bed 504 for supporting the whole endless filter medium forming device E, under the action of the feed screw 506 drivably connected to a stepping motor 505. The working dish 401 is moved between a filter paper removable position (as shown in FIG. 25) and a working position at which adhesive 10 is applied to the bonding end sections 6A, 6B of the pleated filter paper 6. At the working position, the filter paper 6 set on the working dish 401 is positioned immediately below an adhesive applying device 700.

Figure 31A:
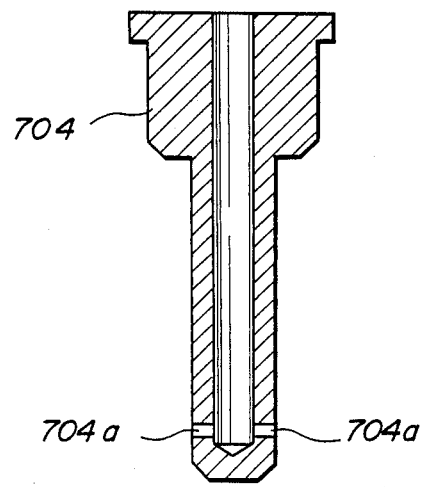
FIG. 31A is a longitudinal cross-sectional view of a nozzle of the adhesive applying device of FIG. 29.
Figure 31B:
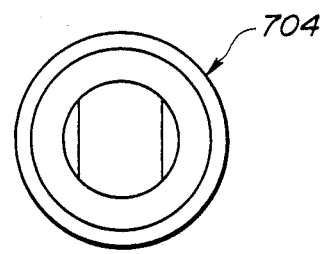
FIG. 31B is an end view of the nozzle of FIG. 31A.
Figure 32:
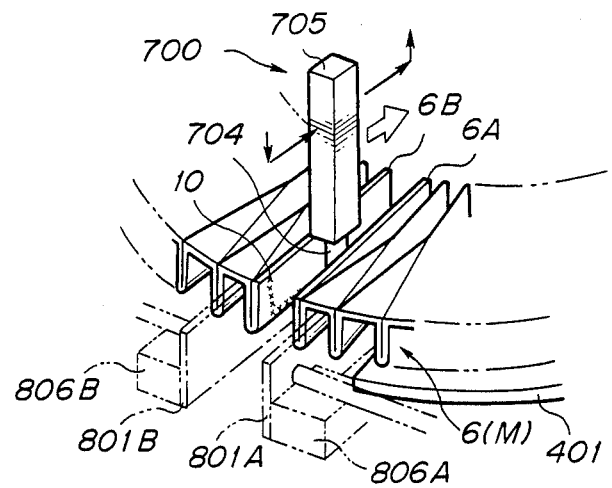
FIGS. 32, 33 and 34 are perspective views showing the process of applying adhesive to the filter medium by the adhesive applying device of FIG. 29.

The adhesive applying device 700 is supported pending from an arm 701 as shown in FIG. 25. An adhesive container 705 is attached to the tip end of a feed screw 703 drivably connected to and extending downwardly from a stepping motor 702. The adhesive container 705 is provided with a nozzle 704 extending downward. As shown in FIGS. 31A and 31B, the nozzle 704 is formed at its tip end section with discharge openings 704a, 704a through which adhesive 10 within the adhesive container 705 is discharged. More specifically, the nozzle 704 is formed with an axially extending elongate hole (no numeral), in which each discharge opening 704a communicates with the elongate hole and extends radially outwardly through the cylindrical wall of the nozzle 704.

Figure 28:
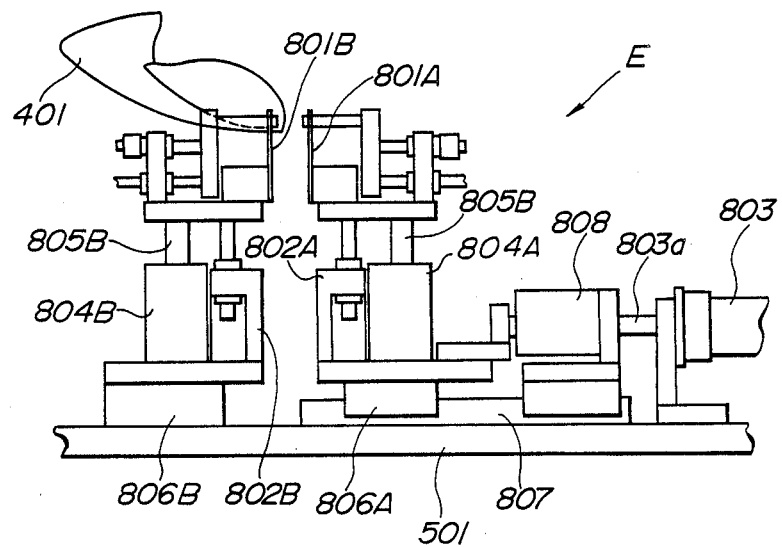
FIG. 28 is a front elevation of a pressing device forming part of the endless filter medium forming device of FIG. 25.
Figure 29:
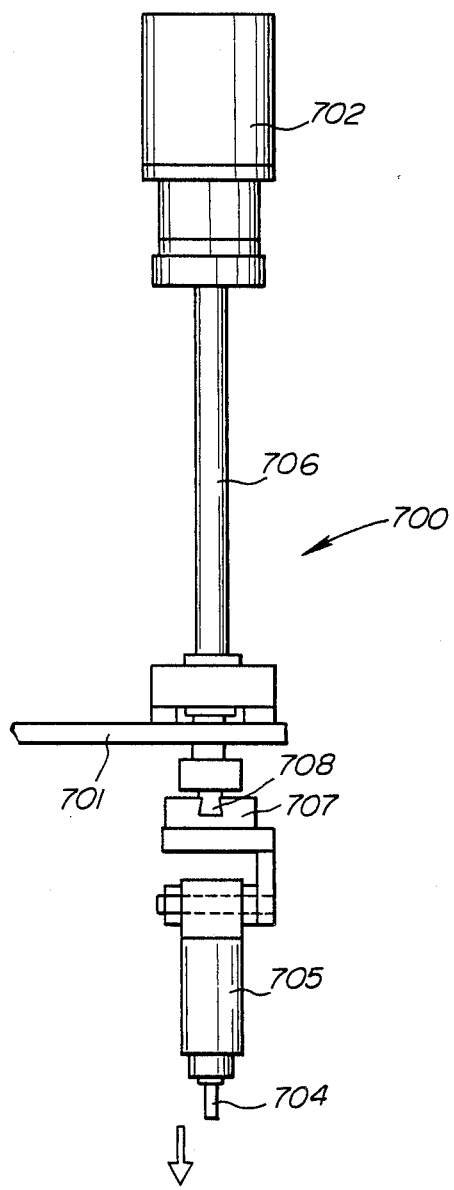
FIG. 29 is a side view of an adhesive applying device forming part of the endless filter medium forming device of FIG. 25.
Figure 30:
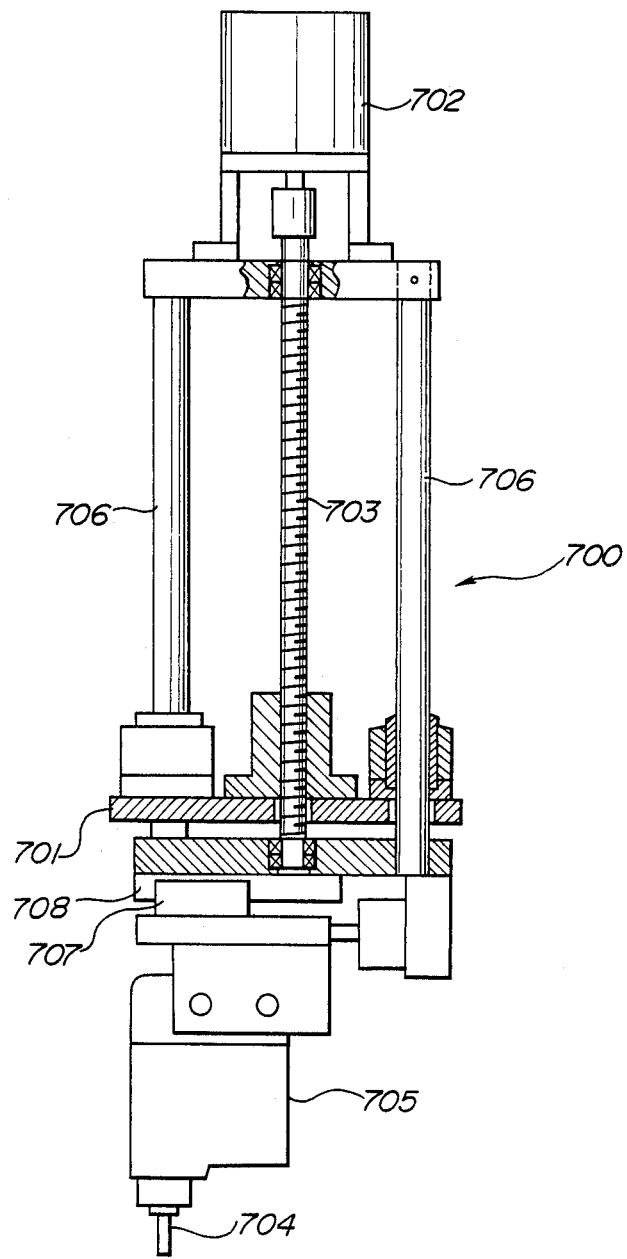
FIG. 30 is a front elevation, partly in section, of the adhesive applying device of FIG. 29.

As illustrated in FIG. 28, the pressing device 800 includes a movable pressure plate 801A and a stationary pressure plate 801B. The movable pressure plate 801A is arranged to be approached to the stationary pressure plate 801B from its position remote from the pressure plate 801B. The movable pressure plate 801A is mounted on a mount 802A and slidably moves leftward and rightward along a guide rail 807 over the middle table 502, under the operation of a pressing air or pneumatic cylinder 803. Thus, the movable pressure plate 801A can move toward or remote from the stationary pressure plate 801B mounted on a mount 806B. Additionally, the movable and stationary pressure plates 801A, 801B can be moved vertically by air or pneumatic cylinders 804A, 804B, respectively.

With the thus arranged endless filter medium forming device E, the working dish 401 is now in the removable position shown in FIG. 21 and therefore located forward and remote from the adhesive applying device 700. Then control of the removable position of the working dish 401 is accomplished upon movement of the support device 400 in the directions of fore-and-aft and left-and-right over the middle table 502 of the drive device 500, under the action of the actuator 404, the stepping motor 505 and/or the air cylinder 803.

The filter paper 6 in the shape of semimanufactured filter medium and already cut by the cutting device 70 is manually located on the working dish 401 on the support device 400. At this time, the filter paper 6 is manually arranged annular in a manner that the bonding end sections 6A, 6B (the sides 16 or 17 of the pleat P) face with each other on the working dish 401. Then the movable pressure plate 801A of the pressing device 800 is inserted into between the sides 16, 17 of the pleat P adjacent the bonding end section 6A, while the stationary pressure plate 801B is inserted into between the sides 16, 17 of the pleat P adjacent the bonding end section 6B.

Thereafter the middle table 502 is moved along the feed screw 506 over the bed 502 under the action of the stepping motor 505 so that the working dish 401 is moved into the working position. Accordingly, the bonding end sections 6A, 6B of the filter paper 6 on the working dish 401 is located immediately below the adhesive discharge nozzle 704 of the adhesive applying device 700. As shown in FIG. 28, the adhesive discharge nozzle 704 is moved downward and toward a position between the bonding end sections 6A, 6B under the operation of the stepping motor 702. Next the whole adhesive applying device 700 moves in accordance with a control program of a control circuit (not shown) for operating the endless filter medium forming device E, so that the adhesive discharge nozzle 704 can move along a predetermined path to apply adhesive 10 onto the bonding end sections 6A, 6B in a predetermined pattern. In this embodiment, the adhesive discharging nozzle 704 is first moved downward, then moved laterally along the length of pleat P, and finally moved upward under the action of the stepping motor 702, discharging adhesive 10. Thus adhesive 10 is applied in the generally angular C-shape on the surface of each bonding end section 6A, 6B of the filter paper 6. Discharge of adhesive 10 from the nozzle 704 is accomplished through the opposite discharge openings 704a, 704a so that adhesive 10 is simultaneously applied to the facing bonding end sections 6A, 6B. After completion of the adhesive application, the adhesive discharge nozzle 704 is moved upward in order to prevent interference with other members.

Figure 33:
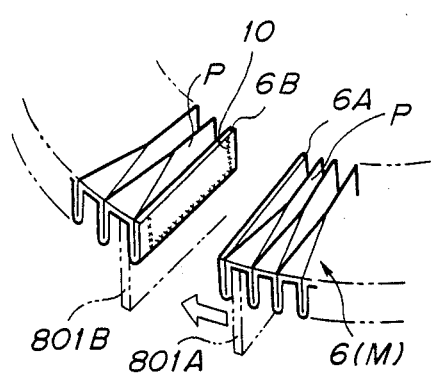
Figure 34:
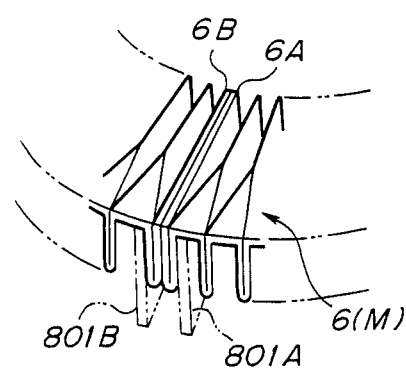

Subsequently as illustrated in FIG. 33, the movable pressure plate 801A carrying the bonding end section 6A is moved toward the stationary pressure plate 801B carrying the bonding end section 11B under the drive of the air cylinder 803 as indicated by an arrow. Simultaneously the locating plates 601A, 601B assist the pressing operation of the pressure plates 801A, 801B thereby accomplishing a secure press action. Accordingly, the end sections 6A, 6B of the annular pleated filter paper 6 are effectively bonded with each other with adhesive 10 as shown in FIG. 34, thus forming the filter paper 6 into the endless and annular shape. As a result, an endless and annular filter medium M (formed of the pleated filter paper 6) is obtained and will be formed into an filter element upon being assembled with other members though not shown.

After completion of formation of the endless filter medium M, the locating plates 601A, 601B of the locating device 600 are moved backward under the action of the actuator 602 in order to facilitate removal of the annular filter medium M from the working dish 401. Additionally the pressure plates 801A, 801B of the pressing device 800 are moved downward under the action of the respective air cylinders 804A, 804B to displace remote from the end sections 6A, 6B which have been bonded with the adhesive 10. Otherwise, the working dish 401 may be moved backward under the operation of the actuator 404 thereby to displace the pressure plates 801A, 801B remote from the bonded end sections 6A, 6B of the annular filter medium M.

While only the filter medium having a pattern of the linear depressions (score lines) shown in FIG. 15 has been shown and described as being used in combination with the filter medium forming system of the present invention, it will be understood that a variety of filter mediums having other linear depression patterns may be used.

What is claimed is:

1. A filter medium forming system comprising:
   means for forming linear depressions on opposite side surfaces of an elongate sheet-type filter medium;
   means for applying adhesive onto the opposite side surfaces of the filter medium at edge sections;
   means for pleating the filter medium along the linear depressions to form a pleated filter medium having a plurality of pleats, each pleat having two sides which are contiguous through each linear depression; and
   means for tightly contacting predetermined sections of the sides of each pleat to bond said predetermined sections with each other with the adhesive.

2. A filter medium forming system as claimed in claim 1, wherein said linear depressions forming means includes first and second scoring drums which are respectively pressed on the opposite side surfaces of the filter paper passing through between said first and second drums, said first drum having a plurality of first linear projections, said second drum having a plurality of second linear projections, each first and second linear projections forming first and second linear depressions on the opposite side surfaces of the filter medium, respectively, upon being pressed on.

3. A filter medium forming process as claimed in claim 1, wherein said adhesive applying means includes means for applying buckling force onto the filter medium in advancing direction of the filter medium.

4. A filter medium forming system as claimed in claim 1, further comprising means for cutting the filter medium along a predetermined pleat to obtain a filter medium having a predetermined length, after bonding the predetermined sections of the sides of each pleat of the filter medium.

5. A filter medium forming system as claimed in claim 4, further comprising means for rounding the filter paper to obtain a curved filter medium, after cutting the filter medium.

6. A filter medium forming system as claimed in claim 5, further comprising means for forming the filter medium into an endless shape to obtain an annular filter medium, after the filter medium is rounded.

7. A filter medium forming system as claimed in claim 4, wherein said cutting means includes length measuring means for generating a detection signal when a predetermined length of said filter paper is measured, and means for cutting the filter medium along the linear depression.

8. A filter medium forming system as claimed in claim 5, wherein said rounding means includes means for rounding said filter element to have a predetermined curvature.

9. A filter medium forming system as claimed in claim 6, wherein said filter medium forming means includes means for bonding opposite end sections of the filter medium with adhesive.

10. A filter medium forming system as claimed in claim 4, wherein said cutting means includes means for defining a passage for the filter medium, means for counting the number of the pleats, a rotatable blade for cutting the filter medium, means for rotatably supporting said blade, said blade support means being movable along a path which is spaced from and parallel with said filter medium passage, means for driving said support means at a speed same as carrying speed of said filter medium, means for rotating said blade, and means for displacing said blade in vertical and horizontal directions when a predetermined number of the pleats are counted by said counting means.

11. A filter medium forming system as claimed in claim 10, wherein said counting means includes a sensor having a photoelectric coupler, and a counter adapted to count output signal of said sensor and provide said blade displacing means with an operating signal when the output signal of said sensor reaches a predetermined number, said operating signal causing said blade displacement means to operate so as to displace said blade.

12. A filter medium forming system as claimed in claim 10, wherein said driving means includes a motor mounted on a frame, a feed screw connected to said motor, and a member having an inside screw engaged with said feed screw, said member being fixed to said supporting means.

13. A filter medium forming system as claimed in claim 10, wherein said blade displacing means includes first displacing means for displacing said blade in a horizontal direction to approach and separate from said filter medium passage, and second displacing means for displacing said blade in a vertical direction to cross the filter medium passage.

14. A filter medium forming system as claimed in claim 13, wherein each of said first and second displacing means includes a pneumatic cylinder.

15. A filter medium forming system as claimed in claim 5, wherein said rounding means includes a guide member for defining a curved passage for the filter medium, high speed carrying means disposed outside said curved passage to carry the filter medium at a first speed, low speed carrying means disposed inside said curved passage to carry the filter medium at a second speed lower than said first speed, and means for heating the adhesive on the filter medium.

16. A filter medium forming system as claimed in claim 15, wherein said high speed carrying means includes a first screw drum having a cylindrical section having thread ridges whose pitch is constant, and a frustoconical section axially aligned and connected with said cylindrical section, said frustoconical section being formed with thread ridges and having an outer diameter increasing in the advancing direction of the filter medium, the thread ridges being engaged with the pleats at a first edge section of the filter medium, said frustoconical section being located forward of said cylindrical section relative to the advancing direction of the filter medium; and said low speed carrying means includes a second screw drum having a cylindrical section having thread ridges whose pitch is constant, and a frustoconical section axially aligned and connected with said cylindrical section, said frustoconical section being formed with thread ridges and having an outer diameter decreasing in the advancing direction of the filter medium, the thread ridges being engaged with the pleats at a second edge section of the filter medium, said frustoconical section being located forward of said cylindrical section relative to the advancing direction of the filter medium.

17. A filter medium forming system as claimed in claim 16, wherein said first and second screw drums have respective axes which are parallel with each other.

18. A filter medium forming system as claimed in claim 15, wherein said high speed carrying means includes a first rotatable roller contactable with the pleats at a first edge section, and a second rotatable roller contactable with the pleats at a second edge section, said first rotatable roller being higher in circumferential speed than said second rotatable roller.

19. A filter medium forming system as claimed in claim 6, wherein said filter medium forming means includes means for supporting the filter medium, means for moving said supporting means between a first position at which the filter medium is removable from said supporting means and a second position at which adhesive is applied to the filter medium, means for applying adhesive onto opposite end sections of the filter medium, and means for biasing the opposite end sections of the filter medium in a direction to approach said opposite end sections to each other.

20. A filter medium forming system as claimed in claim 19, wherein said adhesive applying means includes a nozzle for ejecting adhesive, locatable between the opposite end sections of the filter medium.

21. A filter medium forming system as claimed in claim 20, further comprising means for controllably displacing said nozzle along a predetermined path.

22. A filter medium forming system as claimed in claim 19, wherein said biasing means includes a movable pressure plate for biasing one of said end sections to the other.

23. A filter medium forming system for preparing a pleated filter medium having a plurality of pleats, the plurality of pleats defining adjacent pair of first and second pleats, each pleat having first and second sides which are integrally connected through a first linear depression with each other to form an upwardly-pointing pleat portion, the second side of the first pleat and the first side of the second pleat being integrally connected through a second linear depression with each other to form a downwardly-pointing pleat portion, each pleat side having oppositely located first and second edge sections which have first and second edges, respectively, which extend substantially perpendicular to each linear depression, the first edge sections of the first and second sides of each pleat being approached and bonded to each other to form a plurality of first bonded sections, the second edge section of the first pleat second side and the second edge section of the second pleat first side, of the adjacent pairs of first and second pleats, being approached and bonded to each other to form a plurality of second bonded sections, said filter medium forming system comprising means for forming the first and second linear depressions, means for applying adhesive on the first and second edge sections of the first and second sides, means for pleating the filter medium along the first and second linear depressions, and means for tightly contacting the edge sections of the first and second pleat sides to bond the edge sections.

24. A filter medium forming process comprising the following steps in the sequence set forth:
forming linear depressions on opposite side surfaces of an elongate sheet-type filter medium;
applying adhesive onto the opposite side surfaces of the filter medium at edge sections;
pleating the filter medium along the linear depressions to form a pleated filter medium having a plurality of pleats, each pleat having two sides which are contiguous through the linear depression; and
tightly contacting predetermined sections of the sides of each pleat to bond said predetermined sections with each other with adhesive.

25. A filter medium forming process as claimed in claim 24, further comprising the step of cutting the filter medium along a predetermined pleat to obtain a filter element having a predetermined length, after the tightly contacting step.

26. A filter medium forming process as claimed in claim 25, further comprising the step of rounding the filter paper to obtain a curved filter medium, after the cutting step.

27. A filter medium forming process as claimed in claim 26, further comprising the step of forming the filter medium into an endless shape to obtain an annular filter medium, after the rounding step.

28. A filter medium forming process for preparing a pleated filter medium having a plurality of pleats, the plurality of pleats defining adjacent pair of first and second pleats, each pleat having first and second sides which are integrally connected through a first linear depression with each other to form an upwardly-pointing pleat portion, the second side of the first pleat and the first side of the second pleat being integrally connected through a second linear depression with each other to form a downwardly-pointing pleat portion, each pleat side having oppositely located first and second edge sections which have first and second edges, respectively, which extend substantially perpendicular to each linear depression, the first edge sections of the first and second sides of each pleat being approached and bonded to each other to form a plurality of first bonded sections, the second edge section of the first pleat second side and the second edge section of the second pleat first side, of the adjacent pairs of first and second pleats, being approaches and bonded to each other to form a plurality of second bonded sections, said filter medium forming process comprising the steps, in the sequence as set forth, of forming the first and second linear depressions, applying adhesive onto the first and second edge sections of the first and second edge sections of the first and second sides, pleating the filter medium along the first and second liner depressions, and tightly contacting the edge sections of the first and second pleat sides to bond the edge sections.

29. A filter medium forming system comprising:

means for forming linear depressions on opposite side surfaces of an elongate sheet-type filter medium;

means for applying adhesive onto the opposite side surfaces of the filter medium at edge sections;

means for pleating the filter medium along the linear depressions to form a pleated filter medium having a plurality of pleats, each pleat having two sides which are contiguous through each linear depression; and means for tightly contacting predetermined sections of the sides of each pleat to bond said predetermined sections with each other with the adhesive, said tightly contacting means including first and second screw drums whose axes are parallel with each other, the pleats at a first edge section engaging with thread ridges of said first screw drum, the pleats at a second edge section engaging with thread ridges of said second screw drum, each screw drum having a first section having thread ridges whose pitch decreases in the advancing direction of said filter medium.

30. A filter medium forming system as claimed in claim 29, wherein each screw drum has a second section axially aligned with said first section, said second section having thread ridges whose pitch is constant.

* * * * *